United States Patent [19]

Yong

[11] 4,399,039
[45] * Aug. 16, 1983

[54] TREATMENT OF TAILINGS POND SLUDGE

[75] Inventor: Raymond N. Yong, Beaconsfield, Canada

[73] Assignee: Suncor, Inc., Toronto, Canada

[*] Notice: The portion of the term of this patent subsequent to Aug. 16, 2000, has been disclaimed.

[21] Appl. No.: 338,408

[22] Filed: Jan. 8, 1982

Related U.S. Application Data

[63] Continuation-in-part of Ser. No. 201,888, Oct. 30, 1980, abandoned.

[51] Int. Cl.³ .......................... C02F 1/54; C08L 3/02
[52] U.S. Cl. .................................... 210/728; 210/731; 210/803; 210/901; 208/11 LE
[58] Field of Search ............ 208/11 LE, 13; 210/731, 210/729, 728, 803, 804, 901, 800; 71/64 SC

[56] References Cited

U.S. PATENT DOCUMENTS

| | | | |
|---|---|---|---|
| 3,082,173 | 3/1963 | Horvitz | 210/731 |
| 3,414,512 | 12/1968 | Johnson | 210/731 |
| 3,931,006 | 1/1976 | Baillie et al. | 208/11 LE |
| 3,953,318 | 4/1976 | Baillie et al. | 208/11 LE |
| 3,962,079 | 6/1976 | Hunt et al. | 210/731 |
| 4,008,146 | 2/1977 | Bain et al. | 210/803 |
| 4,018,664 | 4/1977 | Bain et al. | 208/11 LE |
| 4,289,540 | 9/1981 | Yong et al. | 210/729 |

FOREIGN PATENT DOCUMENTS

| | | | |
|---|---|---|---|
| 976901 | 10/1975 | Canada | 208/11 LE |
| 1021281 | 11/1977 | Canada | 208/11 LE |
| 2027684 | 2/1980 | United Kingdom | 210/731 |

Primary Examiner—Benoit Castel
Attorney, Agent, or Firm—Paul Lipsitz

[57] ABSTRACT

A tailings pond sludge layer of high density and strength is obtained by treating the sludge with an additive selected from a specific family of hydrolized starch additives which impart improved permeability and shear strength characteristics to the sludge. Thereafter, the sludge is mixed with sand which adds self-weight whereby further dewatering of the sludge sand mixture is accomplished. Unlike untreated sludges or sludges treated with other known additives or flocculants, sludge treated with the aforementioned hydrolyzed starch additives is able to support the sand.

9 Claims, 23 Drawing Figures

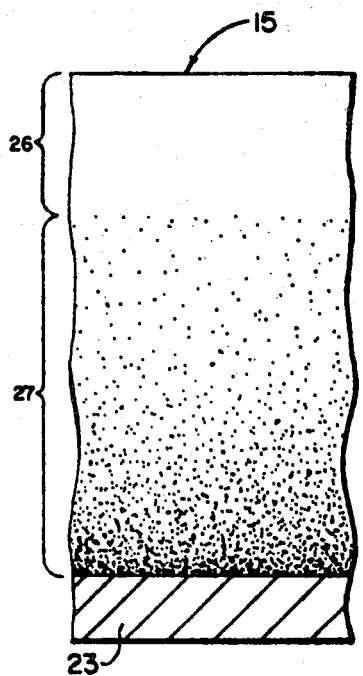 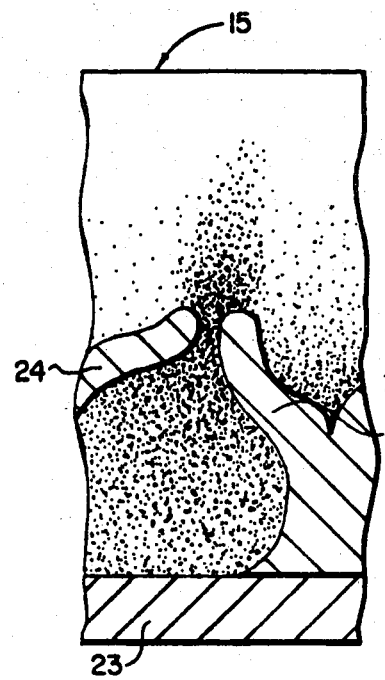 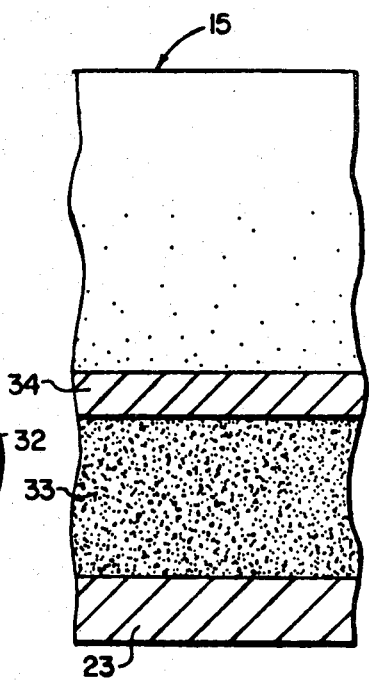
FIG. 2　　FIG. 3 (PRIOR ART)　　FIG. 4
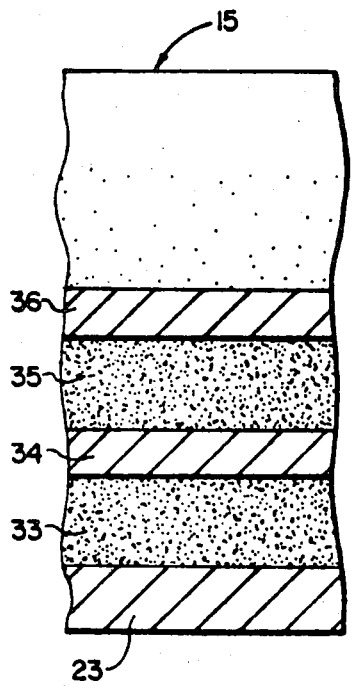 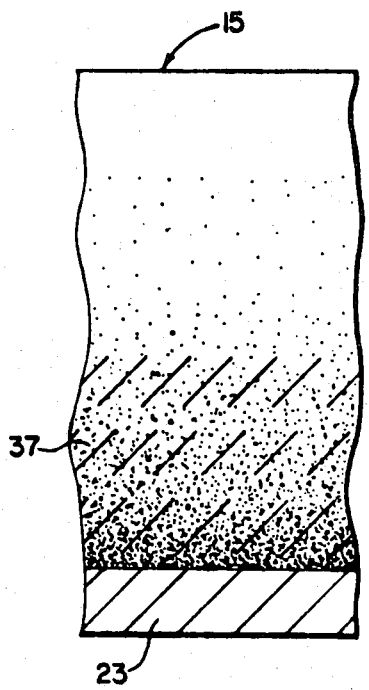 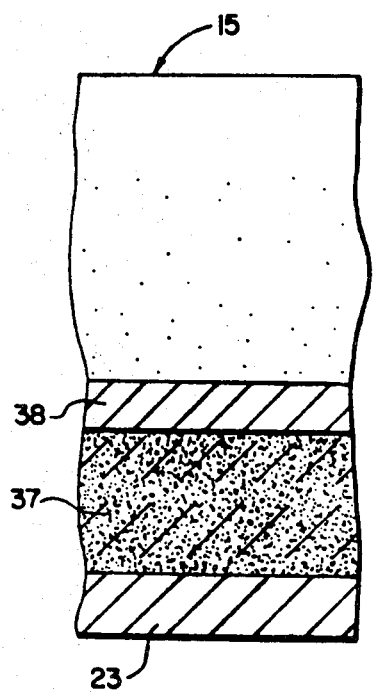
FIG. 5　　FIG. 6　　FIG. 7

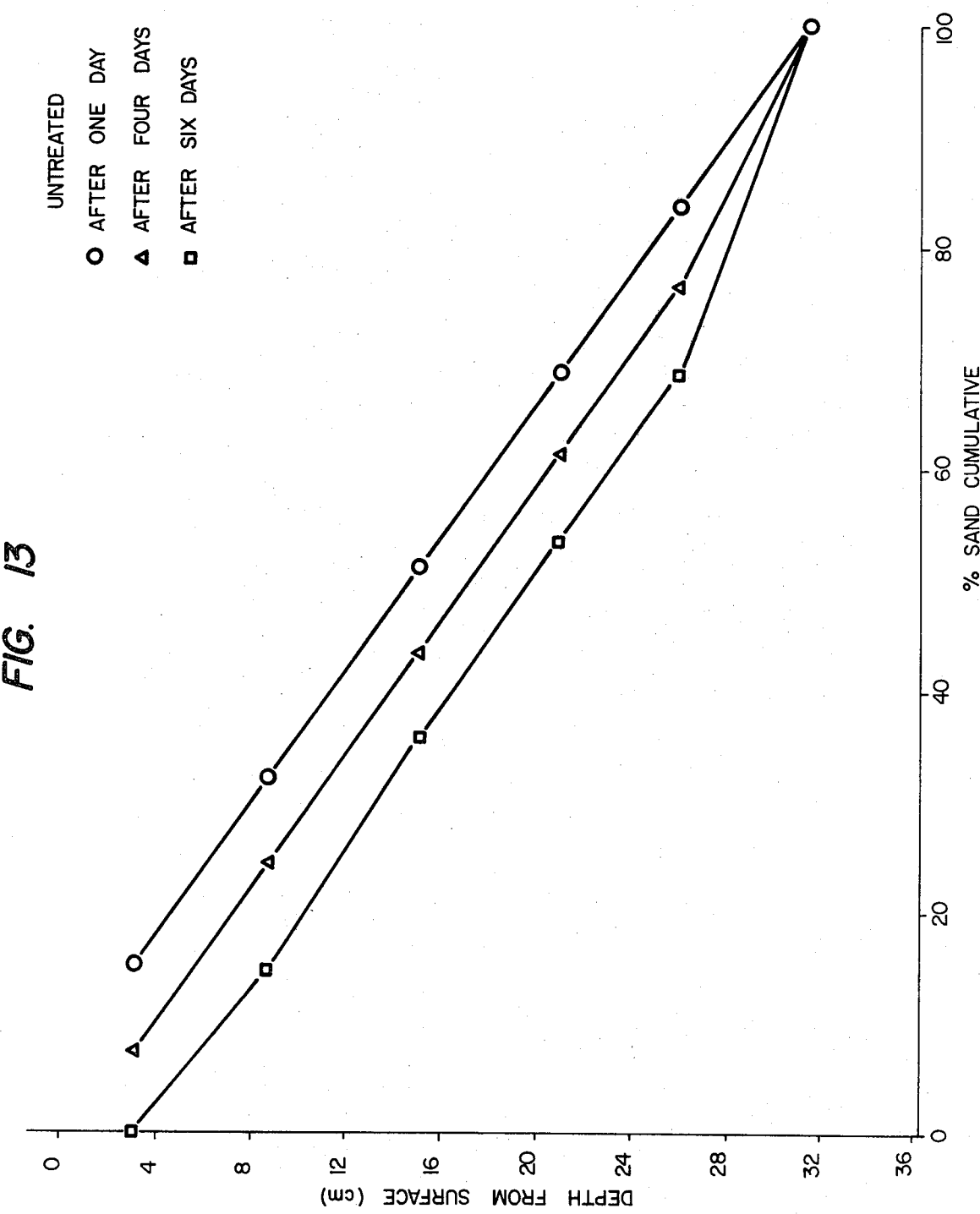

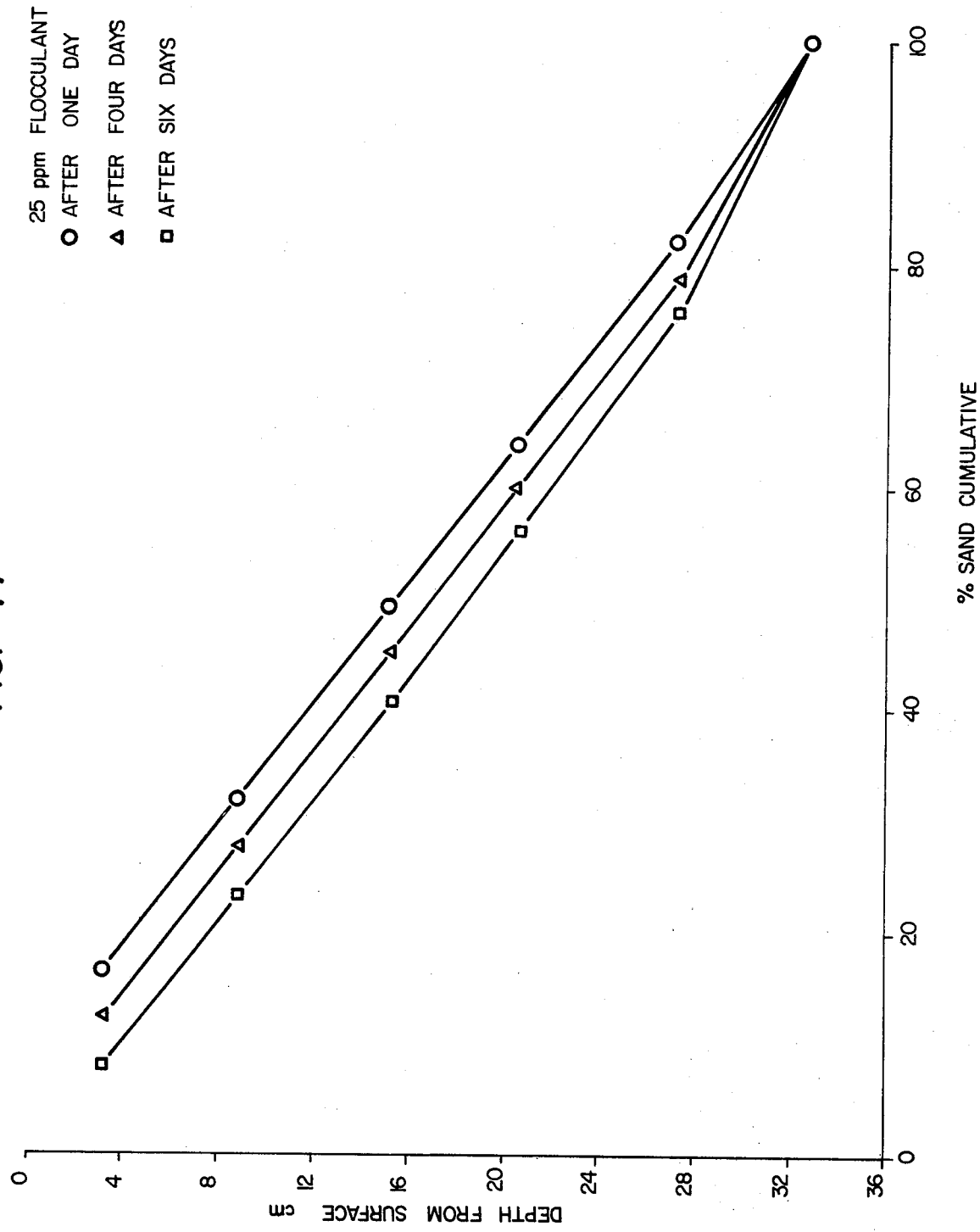

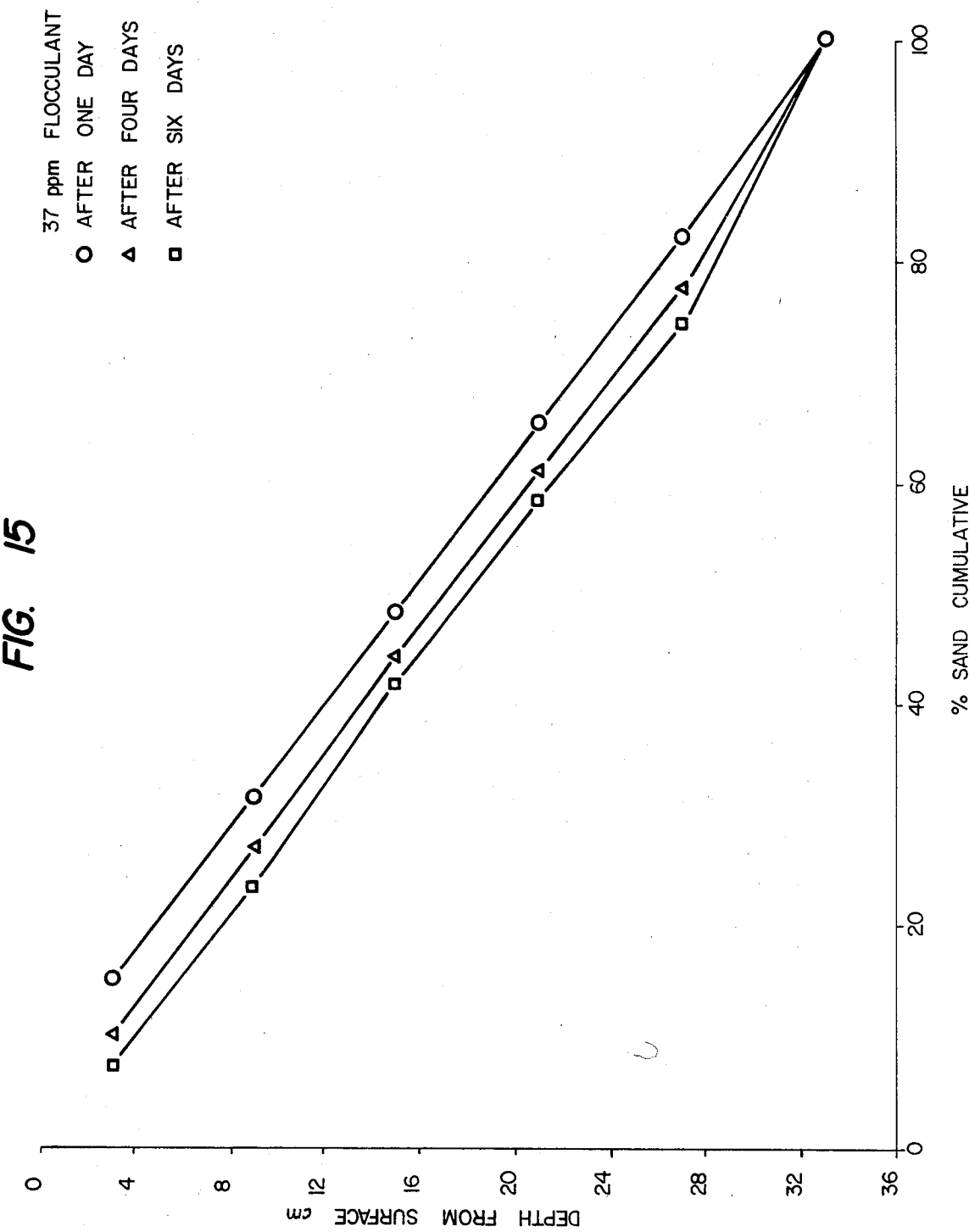

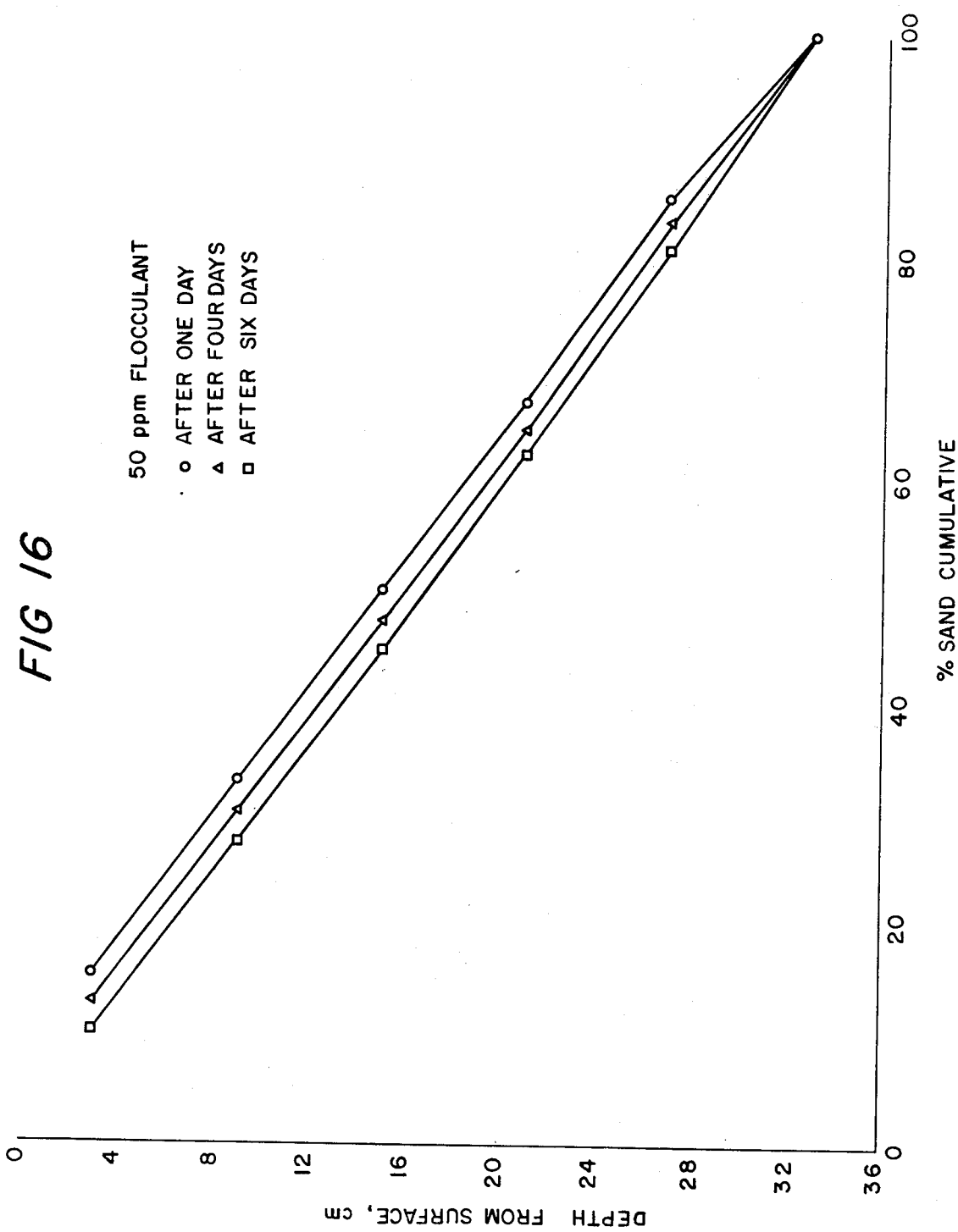

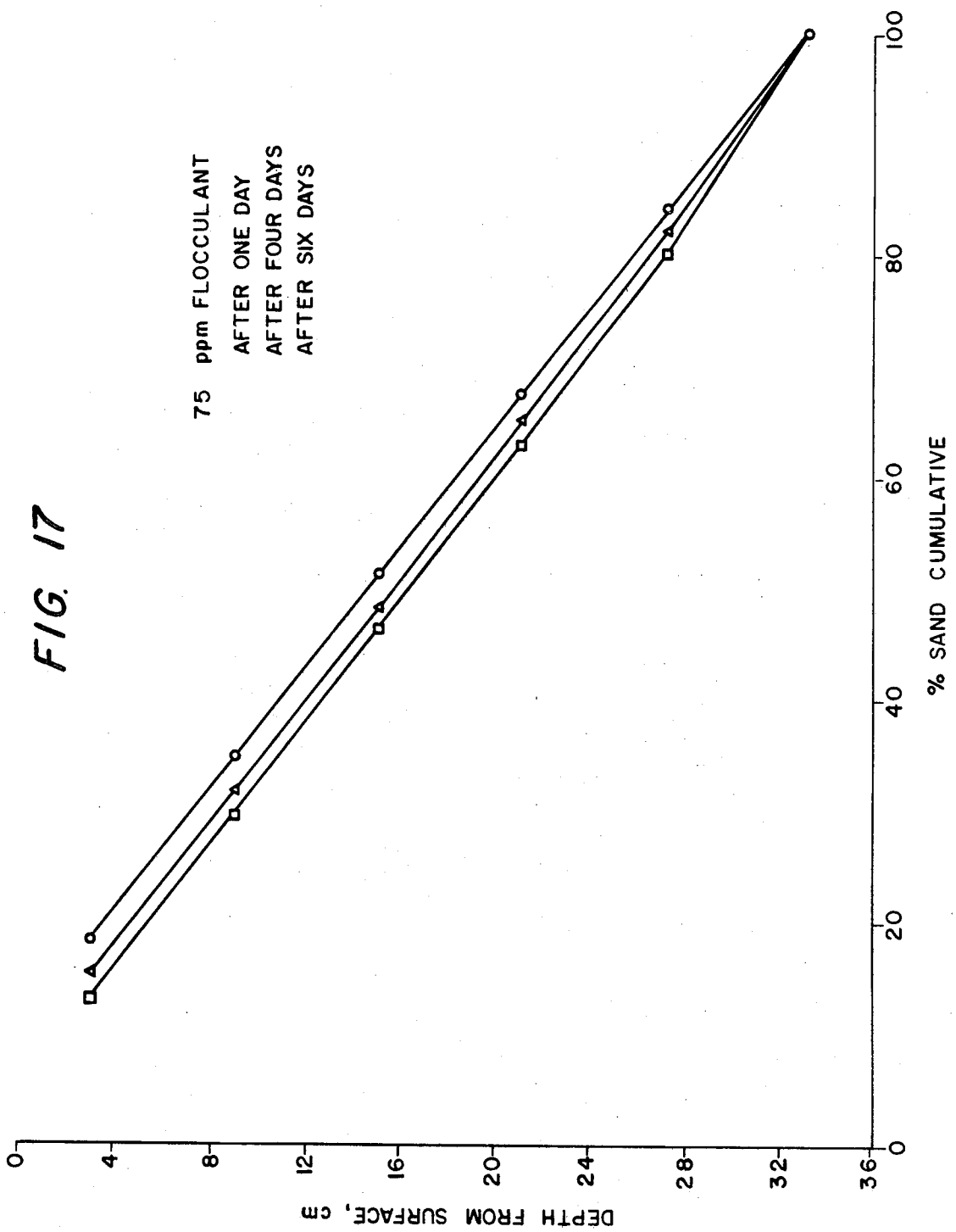

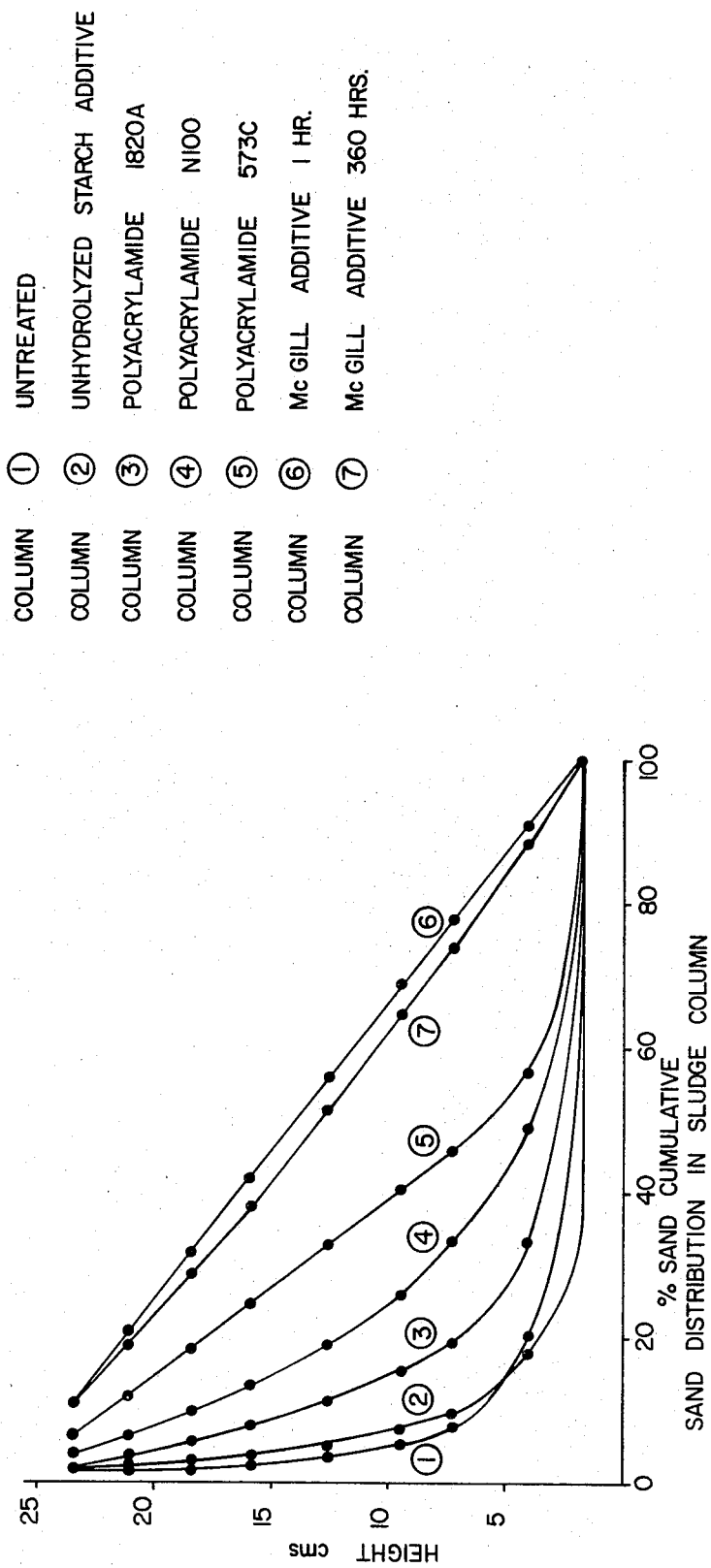

TREATMENT OF TAILINGS POND SLUDGE

This application is a continuation-in-part of patent application Ser. No. 201,888, filed Oct. 30, 1980, and now abandoned.

CROSS-REFERENCE TO RELATED APPLICATIONS

This specification includes material in common with patent application Ser. No. 338,179, filed Jan. 8, 1982 entitled "Method for Dewatering the Sludge Layer of an Industrial Tailings Pond" by Raymond N. Yong, assigned to the same assignee as this application and filed on even date herewith, which related application is a continuation-in-part of patent application Ser. No. 202,103, filed Oct. 30, 1980, and now abandoned.

BACKGROUND OF THE INVENTION

The notorious long term stability, and consequent low rate of dewatering, of natural sludge in storage ponds has resulted in the accumulation of very large volumes of sludge remaining in disposal ponds at many industrial process sites around the world. Tailings ponds of the phosphate industry in Florida, of the tar sands industry in Alberta, Canada, and the bauxite industry in Jamaica are three of a multitude of examples in which this centuries old tailings pond problem persists despite the best efforts of those skilled in the art to significantly improve the slude layer characteristics. Naturally occurring accumulations of sludges and slimes present similar problems in many areas around the world. This invention relates to means for effectively treating such tailings ponds and natural sludge and slime covered regions. The invention, while applicable to virtually all man-made and naturally occuring sludges and slimes, is discussed in the particular context of tar sands tailings ponds inasmuch as the effluent from the hot water process for extracting bitumen from tar sands is particularly difficult to deal with.

Tar sands (which are also known as oil sands and bituminous sands) are sand deposits which are impregnated with dense, viscous, petroleum. Tar sands are found throughout the world, often in the same geographical areas as conventional petroleum. The largest deposit, and the only one of present commercial importance, is in the Athabasca region in the northeast of the province of Alberta, Canada. This deposit is believed to contain perhaps 700 billion-one trillion barrels of bitumen. Comparison, 700 billion barrels is just about equal to the world-wide reserves of conventional oil, 60% of which is found in the Middle East. While much of the Athabasca deposit is not economically recoverable on a commercial scale with current technolgy, nonetheless, a substantial portion is situated at, or very near, the surface where it may fairly readily be mined and processed into synthetic crude oil, and this procedure is being carried out commercially on a very large scale by Great Canadian Oil Sands (now Suncor Inc.—Oil Sands Division) and Syncrude near Fort McMurray, Alberta.

Athabasca tar sands is a three-component mixture of bitumen, mineral and water. Bitumen is the valuable component for the extraction of which tar sands are mined and processed. The bitumen content is variable, averaging 12 wt% of the deposit, but ranging from zero to 18 wt%. Water typically runs 3 to 6 wt% of the mixture, and generally increases as the bitumen content decreases. The mineral content is relatively constant, ranging from 84 to 86 wt%.

While several basic extraction methods to separate the bitumen from the sand have been known for many years, the "hot water" process is the only one of the present commercial significance and is employed by both GCOS and Syncrude. The hot water process for achieving primary extraction of bitumen from tar sand consists of three major process steps (a fourth step, final extraction, is used to clean up the recovered bitumen from downstream processing). In the first step, called conditioning, tar sand is mixed with water and heated with open steam to form a pulp of 70 to 85 wt% solids. Sodium hydroxide or other reagents are added as required to maintain pH in the range of 8.0–8.5. In the second step, called separation, the conditioned pulp is diluted further so that settling can take place. The bulk of the sand-size mineral rapidly settles and is withdrawn as sand tailings. Most of the bitumen rapidly floats (settles upwardly) to form a coherent mass known as froth which is recovered by skimming the settling vessel. A third stream, called the middlings drag stream, may be withdrawn from the settling vessel and subjected to a third processing step, scavenging, to provide incremental recovery of suspended bitumen.

The mineral particle size and type distribution is particularly significant to the operation of hot water process and to sludge accumulation. The terms "sand", "silt", "clay" and "fines" are used in the specification as a simplified approximation of mineral particle size wherein sand is siliceous material which will not pass 325 mesh screen, silt will pass 325 mesh, but is larger than 2 microns and clay is material smaller than 2 microns, including some siliceous material of that size. Fines includes both silt and clay, but excludes sand. It should be again noted that these designations are simplified approximations. For an elegant and in-depth discussion of particle size and type in tar sands sludges, reference may be taken to the article entitled "Mineral Particle Interaction Control of Tar Sand Sludge Stability" by Yong and Sethi which appears in *The Journal of Canadian Petroleum Technology*, Volume 17, Number 4 (October–December 1978).

As previously indicated, conditioning tar sands for the recovery of bitumen consists of heating the tar sands/water feed mixture to process temperature (180°–200° F.), physical mixing of the pulp to uniform composition and consistency, and the consumption (by chemical reaction) of the caustic or other reagents added. Under these conditions, bitumen is stripped from the individual sand grains and mixed into the pulp in the form of discreet droplets of a size on the same order as that of the sand grains. The same process conditions, it turns out, are also ideal for accomplishing deflocculation of the fines, particularly the clays, which occur naturally in the tar sand feed. Deflocculation, or dispersion, means breaking down the naturally occuring aggregates of clay particles to produce a slurry of individual particles. Thus, during conditioning, a large fraction of the clay particles become well dispersed and mixed throughout the pulp.

Those skilled in the art will therefore understand that the conditioning process, which prepares the bitumen resource for efficient recovery during the succeeding process steps, also prepares the clays to be the most difficult to deal with in the tailings disposal operation.

The second process step, called separation, is actually the bitumen recovery step since separation occurs during the conditioning step. The conditioned tar sand pulp is first screened to remove rocks and unconditionable lumps of tar sands and clay, and the reject material, "screen oversize", is discarded. The screened pulp is then further diluted with water to promote two settling processes: globules of bitumen, essentially mineral-free, float upwardly to form a coherent mass of froth on the surface of the separation cells; and, at the same time, mineral particles, particularly the sand-sized mineral, settle downwardly and are removed from the bottom of the separation cell as tailings. The medium through which these two settling processes take place is called the middlings. The middlings consists primarily of water with suspended fine material and bitumen particles.

The particles sizes and densities of the sand and of the bitumen particles are relatively fixed. The parameter which influences the settling processes most is the viscosity of the middlings, and viscosity is directly relates to fines content. Characteristically, as the fines content rises above a certain threshold, which varies according to the composition of the fines, middlings viscosity rapidly reaches high values with the effect that the settling processes essentially stop. In this operating condition, the separation cell is said to be "upset". Little or no oil is recovered, and all streams exiting the cell have about the same composition as the feed. Thus, as feed fines content increases, more water must be used in the process to maintain middlings viscosity within the operable range.

The third step of the hot water process is scavenging. The feed fines content sets the process water requirement through the need to control middlings viscosity which is governed by the clay/water ratio. It is usually necessary to withdraw a drag stream of middlings to maintain the separation cell material balance, and this stream of middlings can be scavenged for recovery of incremental amounts of bitumen. Air flotation is an effective scavenging method for this middlings stream.

Final extraction or froth clean-up is typically accomplished by centrifugation. Froth from primary extraction is diluted with naphtha, and the diluted froth is then subjected to a two-stage centrifugation. This process yields an essentially pure diluted bitumen oil product. Water and mineral removed from the froth during this step constitutes an additional tailings stream which must be disposed of.

In the terminology of extractive processing, tailings is the throw-away material generated in the course of extracting the valuable material from an ore. In tar sands processing, tailings consists of the whole tar sand ore body plus net additions of process water less only the recovered bitumen product. Tar sand tailings can be subdivided into three categories; viz: (1) screen oversize, (2) sand tailings (the fraction that settles rapidly), and (3) tailings sludge (the fraction that settles slowly). Screen oversize is typically collected and handled as a separate stream.

Recently, in view of the high level of ecological consciousness in Canada, United States, and elsewhere, technical interests in tar sands operation, as well as other diverse ore handling operations, has begun to focus on tailings disposal. The concept of tar sands tailings disposal is straightforward. If one cubic foot of tar sands is mined, a one cubic foot hole is left in the ground. The ore is processed to recover the bitumen fraction, and the remainder, including both process material and the gangue, constitutes the tailings that are not valuable and are to be disposed of. In tar sands processing, the main process material is water, and the gangue is mostly sand with some silt and clay. Physically, the tailings (other than oversize) consist of a solid part (sand tailings) and a more or less fluid part (sludge). The most satisfactory place to dispose of these tailings is, of course, in the existing one cubic foot hole in the ground. It turns out, however, that the sand tailings alone from the one cubic foot of ore occupy just about one cubic foot. The amount of sludge is variable, depending on ore quality and process conditions, but averages about 0.3 cubic feet. The tailings simply will not fit back into the hole in the ground.

The historical literature covering the hot water process for the recovery of bitumen from tar sands contains little in the way of a recognition that a net accumulation of sludge would occur. Based on analysis of field test unit operations which led to the Great Canadian Oil Sands plant design near Fort McMurray, Alberta, the existence of sludge accumulation was predicted. This accumulation came to be called the "pond water problem." Observations during start-up and early commercial operations at Fort McMurray (1967–1969) were of insufficient precision to confirm the prediction. Sine 1969, commercial operating data have confirmed the accumulation in GCOS' tailings disposal area of a sludge layer of fines material and water which settles and compacts only very slowly, if at all, after a few years. For a number of reasons, this sludge layer, in common with similar sludge layers observed in tailings ponds associated with mining and extracting processes of many kinds, is particularly important and difficult to deal with.

At the GCOS plant, for dike building, tailings are conveyed hydraulically to the disposal area and discharged onto the top of a sand dike which is constructed to serve as an impoundment for the pool of fluid contained inside. On the dike, the sand settles rapidly, and a slurry of fines, water, and minor amounts of bitumen flows into the pond interior. The settled sand is mechanically compacted to strengthen the dike as it is built to a higher level. The slurry which flows into the pond's interior commences stratification in settling over a time scale of months to years.

Overboarding is the operation in which tailings are discharged over the top of the sand dike directly into the liquid pool. Rapid and slow settling processes occur, but their distinction is not as sharp as in dike building, and no mechanical compaction is carried out. The sand portion of the tailings settles rapidly to form a gently sloping beach extending from the discharge position towards the pond interior. As the sand settles, fines and water commence long-term settling in the pond.

The exceedingly complex behavior and characteristics of tailings ponds have only recently come to be understood beyond the simplistic categorization of various zones such as clarified water, transition, and sludge/slime. Since a tailings pond employed in conjunction with the hot water process for processing tar sands is fairly typical, the following characteristics of the layers or zones in such a tailings pond is a good general example.

Tailings from the hot water process containing a dilute suspension of fine materials in water, together with sand, are discharged to the tailings pond. The formation of sludge by settling of these tailings is attributable primarily to the presence of dispersed clay minerals. Many of the factors which determine the rate at which the clay minerals settle and the characteristics of the sludge formed are set within the tailings discharge. These include intitial clay concentration (clay/water ratio), relative proportions of various clay mineral species, particle size, condition of clay surfaces and pore water chemistry. Experience and laboratory analysis indicate that all these factors vary significantly from time to time depending on the composition of the tar sands feed and the process conditions.

Typically, tailings are discharged over the beach (either directly or from dike construction) where most of the sand settles. The run-off flows continuously into a fluid pool or pond from which water is simultaneously withdrawn as recycle to the tar sands extraction process. Here, additional important determinants of settling behavior are imposed. These include rate of inflow and outflow in relation to surface area and clarified water volume, pond depth, and degree of agitation of pond contents, either through inflows and outflows or via thermal or by wind effects. While initial temperature is inherent in the tailings streams, temperatures in the pond are obviously determined by numerous other factors as well.

Experience and laboratory analyses indicate that when a partly settled sludge remains undisturbed for between several months and about two years in a deep pond, it separates into two distinct layers, a virtually clear water layer on top and a sludge layer beneath. The density of the sludge layer increases gradually with depth due mainly to the presence of more sand and silt particles. These settle either not at all or very slowly because of the significant yield strength of stagnant sludge. The clay/water ratio increases only slightly with depth in the upper part of the pond and scarcely at all in the lower part. After one or two years, little further change in sludge volume occurs. Consolidation at the bottom of the pond is so slow that detection of consolidated material is difficult. Sludge formed in this manner is virtually unchanging over periods of years or decades and for practical purposes may be regarded as terminal sludge.

An active pond involving continuous inflow and outflow is more complex. Experience and laboratory tests indicate that, following discharge to the pond, clay particles undergo an aging process varying in length from a few days to many weeks. Prior to completion of the aging process, the clay particles do not begin to settle. However, once they commence to do so, the process proceeds quite rapidly according to the principles of Stokes Law until a clay/water ratio of about 0.13/1 is reached at which other factors evidently predominate over Stokes Law. In the uppermost part of a well managed pond, these effects result in a more or less clear water layer at the top underlaid by a layer of relatively dilute sludge more or less sharply differentiated from it. This may be termed the sedimentation zone; its volume is determined by the rate of clay inflow and the average aging time required. If the water layer is permitted to become too small in relation to the clay inflow, water outflow and aging time, the upper part of the pond becomes overloaded, the clear water layer virtually disappears and the sedimentation zone becomes much larger since clay is then recycled through the process. GCOS operated under such conditions or on the edge of them through much of the early years.

Sludge in the lower part of a deep active pond which has been in operation for some years is similar to that from an inactive pond; i.e., it may be regarded as terminal sludge. The space below the sedimentation zone and above the terminal sludge may be regarded as a transition zone lacking clear boundaries at top and bottom. It is characterized by a gradual increase in clay/water ratio with depth and owes its existence to the long time needed to attain the terminal sludge condition. Its thickness is primarily a function of the average clay inflow rate in relation to volume.

In summary, an active pond normally has a well-defined clear water layer at the top which can, however, disappear if overloading occurs. Beneath this is sludge which increases in density with depth. There are generally no clearly defined boundaries within this sludge except on occasion a layer of separated bitumen near the interface between water and sludge. However, the sludge may be considered as consisting of three zones each involving successively larger orders of magnitude of time scale for measurable dewatering to occur, and each characterized by the predominance of differing dewatering parameters. These three zones may be termed respectively a sedimentation zone, a transition zone and a terminal sludge zone.

Thus, (1) tar sands contain clay mineral, (2) in the hot water extraction process, most of the clays become dispersed in the process streams and traverse the circuit, exiting in the tailings, (3) the amount of process water input is fixed by the clay content of the feed and the need to control viscosity of the middlings stream, (4) the amount of water required for middlings viscosity control represents a large volume relative to the volume of the ore itself, and (5) upon disposal, clays settle only very, very slowly; thus, the water component of tailings is only partially available for reuse via recycle. That which cannot be recycled represents a net accumulation of tailings sludge.

The pond water problem, therefor, is to devise long-term, economically and ecologically acceptable means to eliminate, minimize, or permanently dispose of the accumulation of sludge. Experience has demonstrated that the problem requires a multifaceted approach toward its solution, and the present invention is directed at achieving one aspect of the solution: a more thoroughly dewatered sludge layer which, as a consequential result, obtains a greater quantity of clarified water for recirculation into the process if necessary in the particular system.

Flocculation of the tailings stream in order to improve the settling characteristics of an industrial process tailings pond has been proposed and practiced in the prior art. In flocculation, individual particles are united into rather loosely-bound agglomerates or flocs. The degree of flocculation is controlled by the probability of collision between the particles and their tendency toward adhesion after collision. Agitation increases the probability of collision, and adhesion tendency is increased by the addition of a flocculant.

Reagents act as flocculants through one or a combination of three general mechanisms: (1) neutralization of the electrical repulsive forces surrounding the small particles which enables the van de Waals cohesive force to hold the particles together once they have collided; (2) precipitation of voluminous flocs, such as metal hydroxides, that entrap fine particles; and (3) bridging of particles by natural or synthetic, long-chain, high-molecular weight polymers. These polyelectrolytes are believed to act by absorption (by ester formation or hydrogen bonding) of hydroxyl or amide groups on solid surfaces, each polymer chain bridging between more than one solid particle in the suspension.

A remarkable number of flocculants have been employed in the prior art to obtain precipitation of particles in tailings ponds of various industrial processes as well as in sewage treatment facilities and naturally occurring slimes. However, a distinct step forward in the art has been achieved by the use of hydrolyzed wheat, corn, and potato starch flocculants as described in U.S. Pat. No. 4,289,540 entitled "Hydrolyzed Starch-Containing Compositions" by Dr. Raymond N. Yong and Dr. Amar J. Sethi. The disclosure of U.S. Pat. No. 4,289,540 is incorporated hereinto by reference. These specific hydrolyzed starch flocculants, particularly taking into account the economics of carrying out flocculation on a large scale, enjoy high performance characteristics for their ability to bring about rapid precipitation to a substantially terminal settled condition. This characteristic is especially valuable for use in those processes, such as the hot water process for obtaining bitumen from tar sands, in which there is a critical need to recycle clarified water from the tailings pond back into the process. However, experience has indicated that the simple use of these hydrolyzed starch flocculants, or for that matter any other known flocculant, results in very little, if any, improvement on the ultimate degree of dewatering of the sludge layer. That is, the terminal status of the sludge layer is just about the same as would be obtained over a much longer period of time by natural settling processes, and this terminal condition is unsatisfactory in that it includes too much water, is too voluminous, and is too unstable.

Nonetheless, it is not accurate to say that all characteristics of a sludge layer obtained as a result of flocculation by the aforementioned hydrolyzed starch flocculants is the same as that achieved naturally or by the use of other flocculants. In point of fact, certain very desirable characteristics to the sludge layer are obtained from the use of the hydrolyzed starch flocculants which are not achieved by natural settling or by the use of any other flocculant presently known, and it is on the appreciation and use of these characteristics that the present invention is based. More particularly, it has been found that the permeability and shear strength characteristics of the sludge layer are both very much increased; as a result, previously impossible dewatering techniques may be employed to compact and stabilize the sludge layer and to extract additional amounts of clarified water therefrom.

It has been proposed in the past, as another approach to alleviating pond water problems, to store the fines in the interstices between the sand grains in the material employed for dike building. Such a process is disclosed in Canadian Pat. No. 1,063,956, issued Oct. 9, 1979, and entitled "Method of Sludge Disposal Related to the Hot Water Extraction of Tar Sands" and corresponding U.S. Pat. No. 4,008,146, issued Feb. 15, 1977. The experience with the procedure described in that reference is that the height to which the dike can be built is somewhat limited; however, it has now been discovered that if the sludge mixed with the sand to prepare the dike building material has been treated with the aforementioned hydrolyzed starch flocculants, the strength of the resultant material is notably increased such that the dike can be built higher, thereby not only permitting a deeper tailings pond, but also storing more sludge in the interstices between the sand grains comprising the dike.

SUMMARY OF THE INVENTION

It is a broad object of this invention to minimize the volume of sludge stored in an industrial process tailings pond.

In another aspect, it is an object of this invention to provide means for mixing sand with the sludge layer of an industrial process tailings pond to increase its self-weight thereby achieving a porous piston effect for compressing, and thus dewatering, the sludge layer.

In a more specific aspect, it is an object of this invention to provide means for controlling the sludge layer of an industrial process tailings pond by mixing sand with sludge which has been treated with hydrolyzed starch flocculant to increase its strength such that the mixture, by self-weight, achieves a porous piston effect for compressing, and thus dewatering, the sludge layer.

DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the accompanying drawing of which:

FIG. 2 is a partial cross-sectional view which illustrates, conceptually and simplistically, the distribution of water and sludge in a tailings pond associated with the apparatus illustrated in FIG. 1;

FIG. 3 is a view similar to FIG. 2 and shows the results of prior art attempts to surcharge the sludge layer of a tailings pond with sand;

FIG. 4 illustrates the effect of surcharging the sludge layer of the tailings pond with sand after the sludge layer has been treated with specific hydrolyzed starch flocculants;

FIG. 5 illustrates the effect obtained by alternating layers of surcharging sand with sludge previously treated with specific hydrolyzed starch flocculants;

FIG. 6 illustrates the effect of internal surcharging obtained by mixing sand with sludge which has been or is simultaneously treated with specific hydrolyzed starch flocculants;

FIG. 7 illustrates the effect of employing a combination of internal and external surcharging techniques with sludge which has been treated with specific hydrolyzed starch flocculants;

FIGS. 13–18 illustrate the variation in sand holding capability of an exemplary sludge treated with progressively increasing dosages of hydrolyzed starch additive;

FIG. 20 illustrates the sand distribution, after given time periods, in a series of columns of the exemplary sand-sludge mixture treated with a series of flocculants.

DETAILED DESCRIPTION OF THE INVENTION

Figure 1:
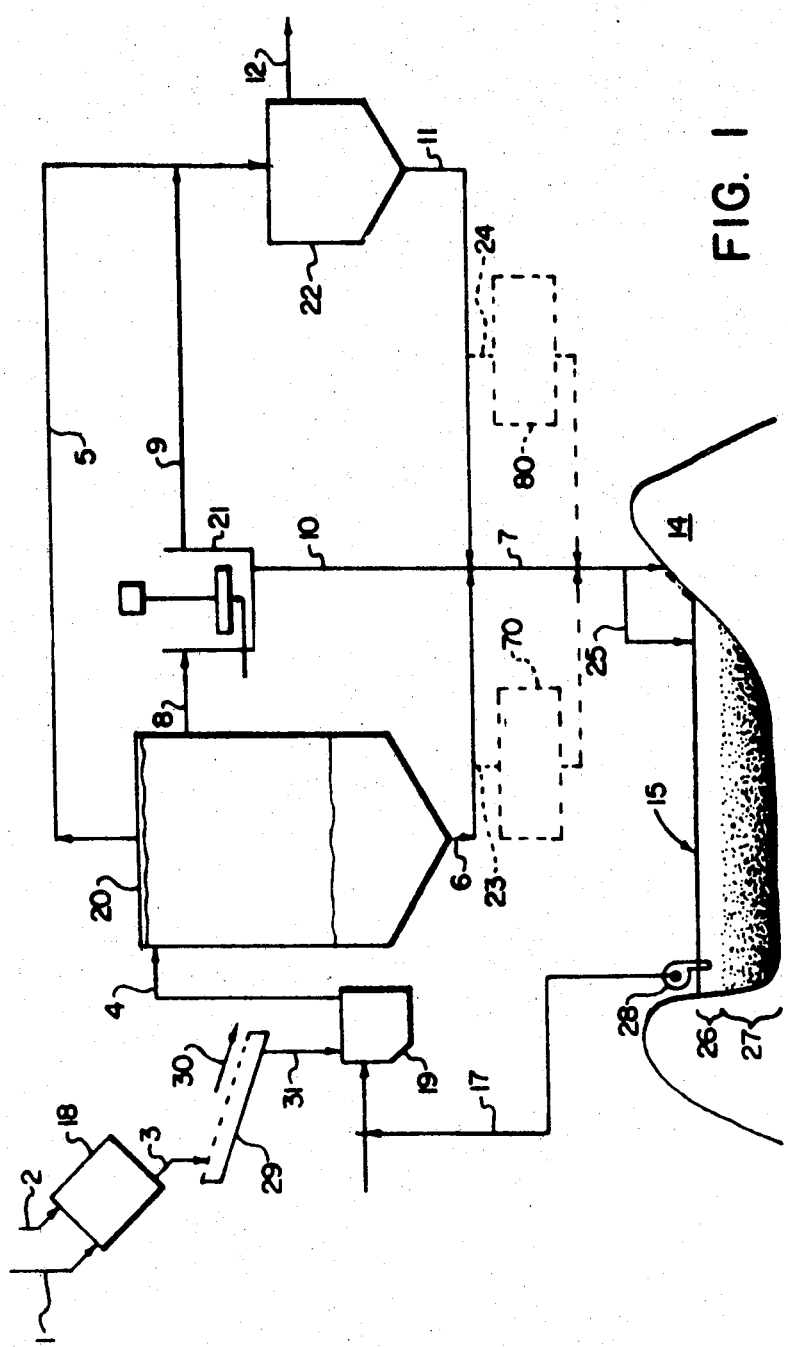
FIG. 1 is a somewhat simplified block diagram of a hot water process for converting bituminous tar sands into bituminous froth for subsequent upgrading to synthetic crude oil.

Referring now to FIG. 1, bituminous tar sands are fed into the system through a line 1 and passed to a conditioning drum or muller 18. Water and steam are intorduced into the muller through another line 2. The total water so introduced in liquid and vapor form is a minor amount based on the weight of the tar sands processed. The tar sands, heated and conditioned with steam and water, pass through a line 3 to a screen 29. The purpose of the screen 29 is to remove from the pulp any debris such as rock or oversized lumps of clay as indicated generally at 30. The oversize material is discarded at a suitable site. The conditioned pulp passes through a line 31 to a feed sump 19 which serves as a zone for diluting the pulp with additional water before it enters a separation zone 20.

The diluted pulp is continuously flushed from the feed sump 19 through a line 4 into the separation zone 20. The settling zone within the separator 20 is relatively quiescent so that bituminous froth rises to the top and is withdrawn through a line 5 while the bulk of the sand component settles to the bottom as a tailings layer which is withdrawn through line 6. It will be understood, of course, that the tailings streams can be transferred individually, with or without downstream treatment, as indicated by the alternate lines 23, 24 and optional treatment processes 70, 80.

A relatively bitumen-rich middlings stream is withdrawn through line 8 to maintain the middlings layer between the froth and the sand layer at a functional viscosity. This middlings material is transferred to a flotation scavenger zone 21 where an air flotation operation is conducted to bring about the formation of additional bituminous froth which passes from the scavenger zone 21 through line 9, in conjunction with the primary froth from the separation zone 20 passing through line 5, to a froth settler zone 22. A bitumen-lean water stream is removed from the bottom of the scavenger zone 21 through line 10. In the froth settler zone 22, some further bitumen-lean water is withdrawn from the froth and removed through line 11 to be mixed with the bitumen-lean water stream from the flotation scavenger zone and the sand tailings stream from the separation zone 20. The bitumen from the settler 22 is removed through line 12 for further treatment, typically final extraction.

Bitumen-lean water from the froth settler 22, the scavenger zone 21, and the separation zone 20, all of which make up an effluent discharge stream carried by line 7, are discharged into a tailings pond 15 which has a clarified water layer 26 and a sludge layer 27. The sand included in the tailings stream quickly settles in the region 14, and the fines-containing water flows into the body of the pond 15 where settling takes place. Water from the clarified water layer 26 may be withdrawn by a pump 28 for recycle through a line 17 to be mixed with fresh makeup water and charged into the hot water process.

Referring now to FIG. 2, the sludge layer 27 of the tailings pond 15 is overlayed with a clarified water layer 26. (As previously noted, this is a considerable simplification, but is adequate and appropriate for an understanding of the present invention.) The sand bottom 23 of the pond defines the lower limit of the sludge layer 27 which, as previously discussed, increases a mineral-to-water ratio from top to bottom. The characteristics of the sludge layer 27 so formed is unacceptably and insufficiently dewatered and compacted to minimize the pond volume required to contain the sludge and to obtain a stable sludge structure.

It has been proposed in the past to "surcharge" a sludge layer with a layer of sand whereby the sand acts as a permeable piston to compress the sludge and force water out of it. All attempts to carry out this surcharging concept have met with conplete failure or have been performed under conditions which yield only marginal, if any, benefits under very limited conditions. See, by way of example, U.S. Pat. No. 4,036,752, issued July 19, 1977, and entitled "Dewatering Clay Slurries."

What has been observed in practice, when such techniques have been attempted in large, relatively deep tailings ponds, is illustrated in FIG. 3. As a layer of sand 24 is broadcast over the sludge layer 27, the sand layer is observed to tilt and dump through the sludge layer as shown generally in the region 32. The sludge layer is simply incapable of supporting a useful surcharge of sand. Thus, in the prior art, sand surcharging has been theoretically interesting, but totally impractical as a process for dewatering and compacting sludge, and this has been the case whether the sludge was allowed to settle naturally or the settling process was accelerated by the use of flocculants.

However, it has been determined that the use of the specific hydrolyzed starch flocculants described in the above-referenced Canadian patent applications produces a sludge layer with remarkably enhanced shear strength and permeability characteristics, and an appreciation of this fact resulted in reconsideration of the heretofore substantially impractical and discarded sand surcharge concept. Throughout the remainder of this specification the term "hydrolyzed starch flocculant" means one of the specific hydrolyzed starch additives disclosed and claimed in the above-referenced U.S. Pat. No. 4,289,540, or a chemical or fully-functional equivalent employing a base starch material other than wheat, corn, or potato as, for example, rice or tapioca which may be more plentiful in certain world regions.

As shown in FIG. 4, a sludge layer 33 which has been treated with a hydrolyzed starch flocculant is capable of supporting a substantial sand surcharge which operates as a porous piston to compact and dewater the sludge layer. In addition, the observed improved permeability of the sludge layer 33 resulting from treatment with a hydrolyzed starch flocculant affords an enhancement to the degree of compaction of dewatering which can be achieved. Furthermore, as shown in FIG. 5, sludge layer 33, treated with a hydrolyzed starch flocculant, is sufficiently strong that a second layer of sludge 35 may be layed over the sand layer 34 and the second sludge layer, itself, may be subjected to a surcharge brought about by another sand layer 36. For relatively deep tailings ponds, a number of such alternate layers of treated sludge and sand may be employed to obtain a very high degree of compaction and dewatering.

It has also been proposed in the prior art to mix sludge, which has been flocculant-treated, with sand to obtain a material which, in effect, is "internally surcharged." One may refer, by way of example to U.S. Pat. No. 3,680,693 issued Aug. 1, 1971, and entitled "Process for the Treatment of Slime and Waste Solids." While this technique has been promising, the amount of sand which can be added to the sludge has been limited by the strength of the sludge and, as previously noted, no previously known flocculant affords the strength and permeability enhancement to the sludge layer observed to result from use of the hydrolyzed starch flocculants previously identified. It has now been found that sand mixed with sludge treated with one of these hydrolyzed starch flocculants results in a material which, indeed, exhibits important internal surcharge characteristics resulting in a compacted sand/sludge layer 37 as illustrated in FIG. 6. Furthermore, as shown in FIG. 7, a combination of internal and external sand surcharging techniques may be employed in which the mixed sand/-treated-sludge layer 37 is itself overlayed with a sand layer 38. In addition, of course, the multilayering technique illustrated in FIG. 5 is equally applicable.

It has been observed at the Suncor-Oil Sands Division plant that on the order of 35% of the fines (and a larger portion of the clay component) is discharged into the tailings pond; the remainder is stored in the interstices between adjacent sand grains or is discarded as lumps which are part of the oversize. It has been proposed in the past to increase the quantity of silt, and particularly the quantity of clay, stored in the interstices between adjacent sand grains in the material employed to build a pond-impounding dike. By way of example, one may refer to previously referenced U.S. Pat. No. 4,008,146, issued Feb. 15, 1977, and entitled "Method of Sludge Disposal Related to the Hot Water Extraction of Tar Sands" and also to the corresponding Canadian Pat. No. 1,063,956, issued Oct. 9, 1979. As disclosed in that reference, sand and sludge are admixed in a prescribed fashion, and the resultant material is discharged at the dike site to effect dike building. This is an important concept, but its use in practice has been somewhat limited because the stability of the resulting dike structure is insufficient to permit building the dike to a height which represents storage of meaningful additional quantities of fines.

It has now been determined that, if sand is admixed with sludge which has been treated with a hydrolyzed starch flocculant, an important increase in the strength of the resulting material, when employed for dike building, is observed such that the resulting structure is much more stable. Thus, substantially higher dikes can be built, and significantly large quantities of silt and, particularly, clay can be stored in the interstices between adjacent sand grains in the material.

Figure 8:
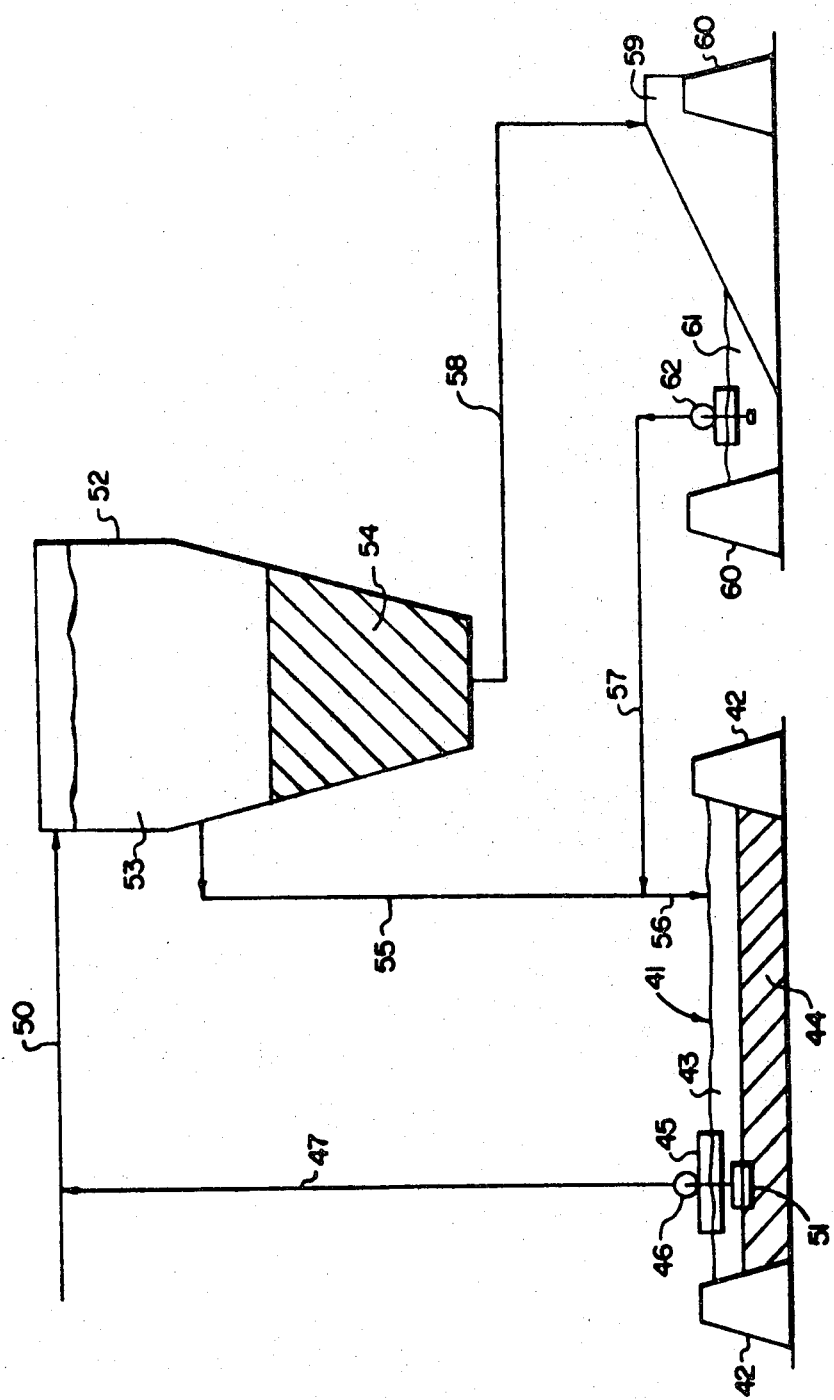
FIG. 8 illustrates a general approach for increasing the amount of fines stored in the interstices between adjacent sand grains in a dike.

An exemplary procedure for storing silt and clay particles in the interstices between adjacent grains of sand in a sand dike is illustrated in FIG. 8. A tailings pond 41 is enclosed by dike walls 42 and contains a clarified water layer 43 and a sludge layer 44. Sludge is withdrawn from the pond 41 via sludge withdrawal means 51 and is transferred to a line 47 by a pump 46 which is supported by flotation means 45 on the surface of the pond 41. The sludge material is transferred from the line 47 into a line 50 where it is combined with, by way of example, tailings material from the hot water extraction process for recovering bitumen from tar sands. This waste water stream from the extraction process is primarily water and sand, but inclues minor amounts of silt, clay, and bitumen. Thus, the combined streams which are transferred from line 50 into a settling zone 52 contain a substantial amount of sand.

In the settling zone 52, an upper layer 53 and a lower layer 54 are formed. The upper layer is withdrawn through line 55 and is transferred into a line 56, where it is combined with beach run-off water transferred from zone 61 via line 57, and added to the retention pond 41.

The lower layer 54 in settling zone 52 is withdrawn through a line 58 and is transferred to an inclined sand pile 59 situated adjacent a dike 60. The lower layer 54 of the settling zone 52 typically comprises on the order of 2% bitumen, 39% sand, 9% silt, 4% clay, and 46% water. This mixture is dispersed over the sand pile to form additional sand layers whereby a part of the clay, silt, and water in the stream is retained in the interstices of the sand layers. The remainder of the aqueous stream percolates down the inclined sand pile zone and settles into the retention zone 61. A pump 62 in the retention zone 61 withdraws the aqueous portion of that pond and transfers it into the line 57 where, as previously noted, it is combined with the stream from the upper layer of zone 52 in the line 56.

Thus, a part of the sludge from the tailings pond 41 is removed and dispersed with the sand of the wastewater stream over the pond dike wall to carry out dike building. Substantially increased quantities of the sludge withdrawn from the pond are stored in the interstices of the sand pile zone 59 thereby providing a means for reducing the solids content and, more importantly, clay content of the tailings pond 41. It may be noted that tailings pond 41 and retention zone 61 can be unitary wherein the sand pile 59 is located on the dike walls 42 of the tailings pond 41. In that manner, only one pond is necessary to conduct the whole process, and there is no need to transfer clarified water from the zone 61 to the zone 41.

If, as previously discussed, the sludge layer 44 in the retention pond 41 has been treated with the hydrolyzed starch flocculant, the strength of the resultant sand/-sludge mixture discharged onto the sand pile 59 to increase the height of the dike will be very much stronger, thereby permitting the dike to be built to a substantially greater height without compromising its integrity.

Figure 9:
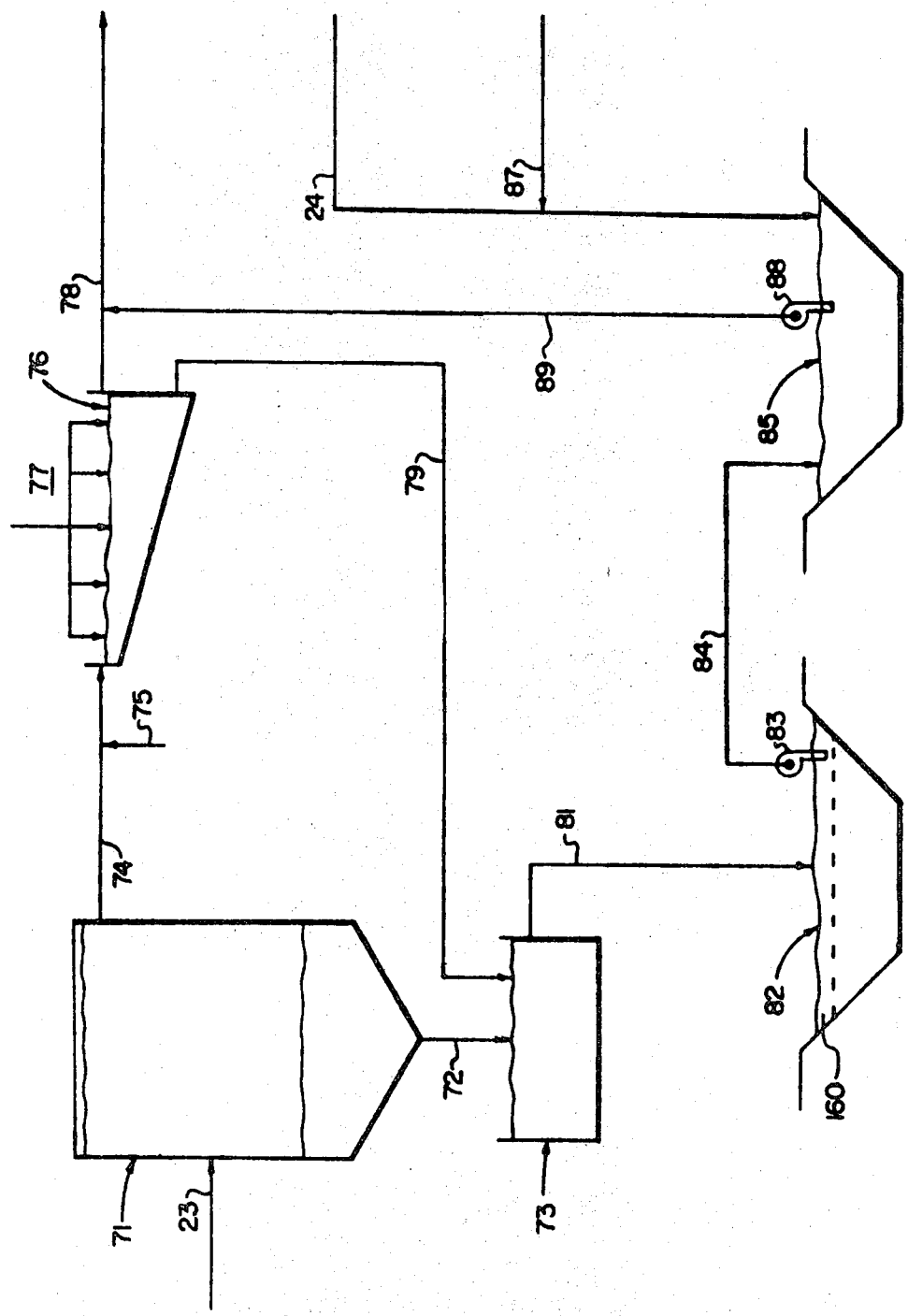
FIG. 9 illustrates an exemplary specific method for adding hydrolyzed starch flocculant to the tailings of a tar sands hot water process.

An exemplary system for adding hydrolyzed starch flocculant to the tailings from the separation zone 20 discharged through the line 6 and alternative line 23 (FIG. 1) is illustrated in FIG. 9. Tailings from the separation cell are transferred, via line 23, to a sand separation zone 71 in which the sand component rapidly settles to the bottom for discharge as wet sand through a line 72 to a tailings sump 73. Tailings water is withdrawn from the sand separation zone 71 at a higher point via line 74 into which the hydrolyzed starch flocculant is introduced through a line 75. The flocculated tailings water is then discharged into a thickening pond 76 which functions as a holding zone during the several days residence period required for the flocculant to settle the fines (principally clay) well below the surface. Optionally, the hydrolyzed starch flocculant may be broadcast on the surface of the thickening pond as indicated in the region 77, or a combination of flocculant dosing techniques may be applied to the tailings water. Virtually clear water may be withdrawn from the upper layer of the thickening pond 76 via line 78 for recycle into the hot water process.

Thickened tailings water is drawn from the lower regions of the thickening pond 76 and is transferred, via line 79, to the tailings sump 73. The content of the tailings sump 73, which will be a sand and flocculated thickened tailings water mixture, is withdrawn via line 81 and transferred to a sand pond 82. In the sand pond 82, further settling takes place and, because of the use of the hydrolyzed starch flocculant, an effect takes place corresponding to that illustrated in FIG. 6; i.e., a higher degree of dewatering and compaction results than would be obtained if another type of flocculant were used. As a result, a clarified water layer 160 is also present on the surface of the sand pond 82, and this clarified water layer may be withdrawn by pump 83 for transfer via line 84 to a primary tailings pond 85.

Tailings from downstream incremental bitumen recovery processes, which essentially comprise fines-laden water, may also be conducted via line 24 for discharge into the primary tailings pond 85. Hydrolyzed starch flocculant may also be added to this tailings stream as indicated at 87 in order to maintain the flocculant dosage in the primary tailings pond 85 at an optimum level. Clarified water is withdrawn by pump 88 from the upper level of the primary tailings pond 85 for recycle via line 89 to the hot water process.

Figure 10:
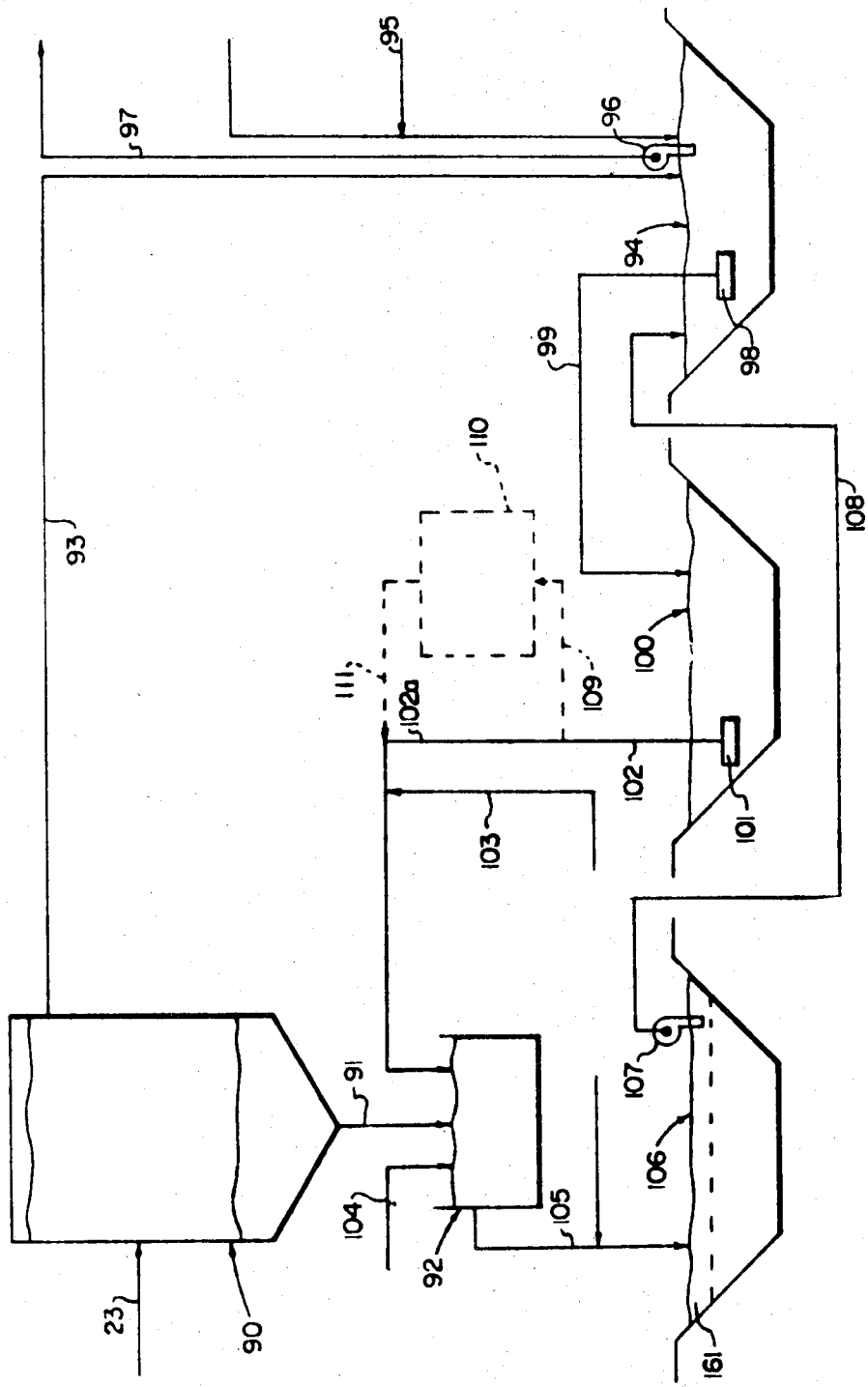
FIG. 10 illustrates a method for the addition of hydrolyzed starch flocculants to sludge, accompanied by sand inclusion, found in the tailings system of a tar sands hot water process.

FIG. 10 illustrates an examplary system for accomplishing addition of hydrolyzed starch flocculant to sludge accompanied by sand inclusion to obtain the effect illustrated in FIG. 6 and discussed above. Tailings from the separation cell are conveyed via line 23 to a sand separation zone 90 wherein the sand component rapidly settles to the bottom for discharge through line 91 to a tailings sump 92. Fines-containing tailings water is withdrawn from an upper region of the sand separation zone 90 through line 93 for discharge into a primary tailings pond 94. The primary tailings pond 94 also receives, via line 24, the tailings from the downstream processes for extracting incremental amounts of bitumen. As indicated at 95, hydrolyzed starch flocculant may be added to this stream to maintain the flocculant dosage in the primary tailings pond at a desired level. Clarified water is withdrawn, by pump 96, for recycle via line 97 back into the hot water process.

Sludge is withdrawn from the sludge layer of primary tailings pond 94 by a pump 98 and is transferred via line 99 to an auxiliary pond 100 which functions essentially as a sludge holding area. Sludge is withdrawn from the auxiliary pond 100 by a pump 101 and is transferred via line 102 to the tailings sump 92. It will be understood that, if the sludge withdrawal rates from the primary tailings pond 94 is commensurate with the capacity of the tailings sump 92, the transfer of sludge to the auxiliary pond 100 need not necessarily be carried out. As a practical matter, such nice adjustments cannot always be achieved, and it is therefore often desirable to provide the auxiliary pond 100.

Hydrolyzed starch flocculant is added to the wet sand/sludge mixture by injecting it into the sludge stream from the auxiliary pond 100 (as indicated at 103), by adding the flocculant to the tailings sump 92 (as indicated at 104), and/or by adding the flocculant to the mixture discharged from the tailings sump 92 through line 105 for discharge into a third pond 106. In the third pond 106, a high degree of dewatering and compaction of the sand/hydrolyzed starch flocculated sludge mixture, generally as depicted in FIG. 6, takes place. As a result, clarified water from a layer 161 may be withdrawn, by pump 107 from the upper layer of the pond 106 and transferred via line 108 to the primary tailings pond 94 from which it is available as recycle water to the hot water process.

It may be noted that the system sludge has a bitumen content which may be sufficient for economic recovery as the price of crude oil continues to increase. For that reason, provision may be made to bypass section 102a of line 102 by a circuit which includes line 109, optional tertiary bitumen recovery process 100, and line 111.

Figure 11:
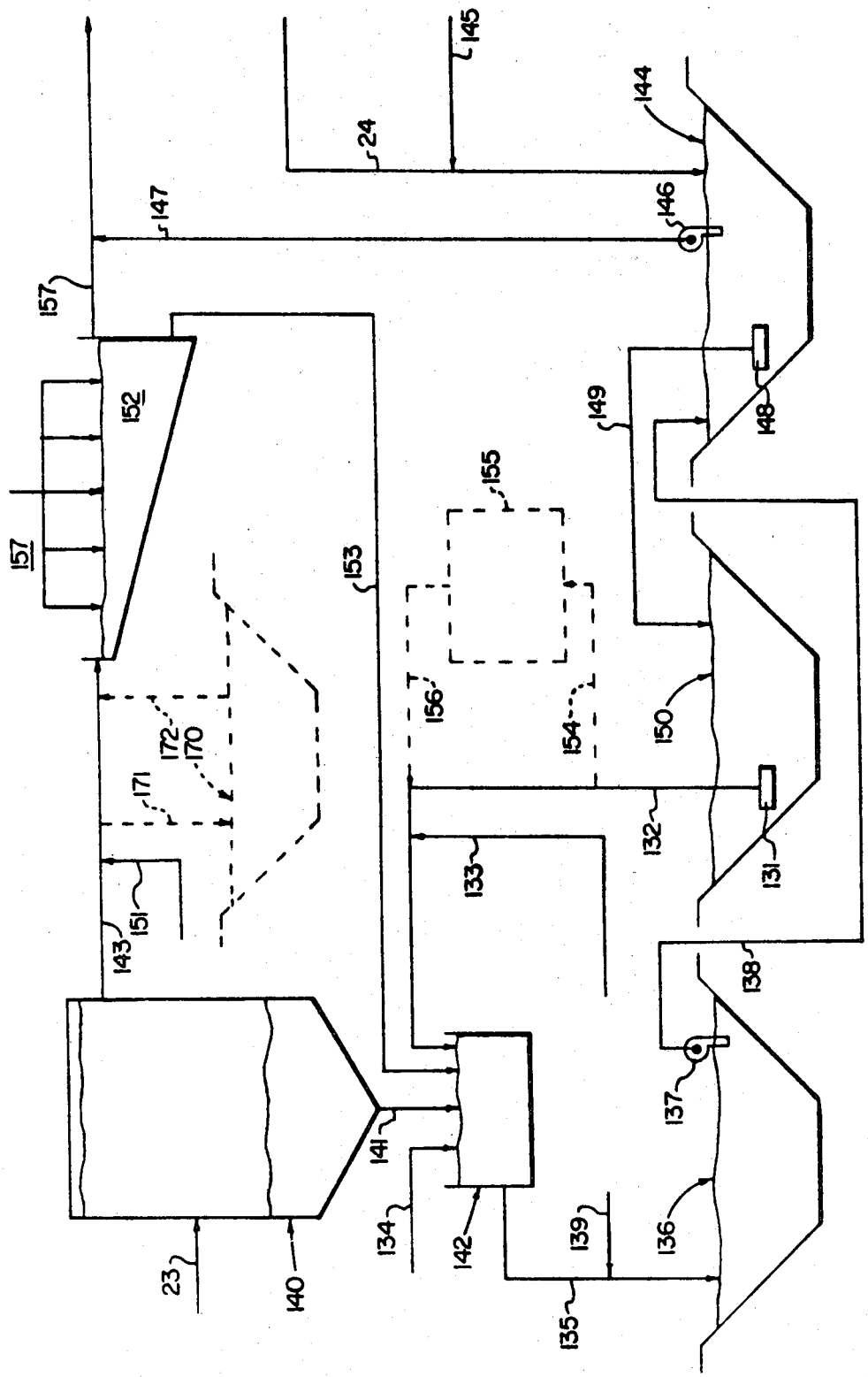
FIG. 11 illustrates a comination of the techniques illustrated in FIGS. 9 and 10 by which a more rapid recovery of clarified water may be obtained.

FIG. 11 illustrates a system which combines the techniques illustrated in FIGS. 9 and 10 in order to obtain a higher rate of recovery of recycle water and, particularly, to minimize the containment volume required to hold the sludge. Such a higher water recovery rate may be dictated by the fresh water requirements of the entire hot water process system or, in a given installation, may only be necessary during periods when relatively poor (i.e., high in clay content) tar sands feed is being worked. The containment volume problem is critical at sites of limited area and is, for example, more important at the Suncor-Oil Sands Division lease site than the fresh water aspect.

Tailings from the separation cell are transferred, via line 23, to a sand separation zone 140 in which the sand component rapidly settles to the bottom for discharge as wet sand through a line 141 to a tailings sump 142. Tailings water is withdrawn from the sand separation zone at a higher point via line 143 into which hydrolyzed starch flocculant is introduced through a line 151. The flocculated tailings water is then discharged into a thickening pond 152 which functions as a holding zone during the residence period (on the order of up to one day required for the flocculant to settle the fines (principally clay) well below the surface. Optionally, the hydrolyzed starch flocculant may be broadcast on the surface of the thickening pond as indicated in the region 157, or a combination of flocculant dosing techniques may be administered to the tailings water. Virtually clear recycle water may be withdrawn from the upper level of the thickening pond 152 via line 157 for recycle into the hot water process. Thickened tailings water is withdrawn from the lower region of the thickening pond 152 and is transferred, via line 153, to the tailings sump 142.

Because clay particles undergo an aging process varying in length from a few days to many weeks before they begin to settle, an individual practical installation may require the addition of a holding pond 170 which receives the tailings water via a line 171. Aged tailings water is withdrawn through line 172 and transferred to the thickening pond 152.

A first tailings pond 144 receives, via line 24, the tailings from downstream processes for extracting incremental amounts of bitumen. As indicated at 145, hydrolyzed starch flocculant may be added to this stream to maintain the flocculant dosage in the first tailings pond at a desired level. Clarified water is withdrawn, by pump 146, for recycle, via line 147, back into the hot water process along with the recycle water obtained from the thickening pond 152.

Sludge is withdrawn from the sludge layer of the first tailings pond 144 by pump 148 and is transferred via line 149 to a second tailings pond 150 which functions essentially as a sludge holding area. Sludge is withdrawn from the lower region of the second tailings pond 150 by a pump 131 and is transferred via line 132 to the tailings sump 142. It will be understood that if the sludge withdrawal rate from the first tailings pond 144 is commensurate with the capacity of the tailings sump 142, the transfer of sludge to the second tailings pond 150 need not necessarily be carried out.

Hydrolyzed starch flocculant is added to the wet sand/sludge mixture by injecting it into the sludge stream from the second tailings pond 150 as indicated at 133, by adding the flocculant to the tailings sump 142 as indicated at 134, and/or by adding the flocculant to the sand/sludge mixture discharged from the tailings sump 142 through line 135 into a third tailings pond 136, as generally indicated at 139. In the third tailings pond 136 a high degree of dewatering and compaction of the sand/hydrolyzed starch flocculated sludge mixture, in the manner depicted in FIG. 6, is obtained. As a result, clarified water may be withdrawn, by pump 137, from the upper layer 162 of the third tailings pond 136 for transfer via line 138 to the first tailings pond 144 from which it is available as recycle water to the hot water process.

As previously noted, the sludge has a significant bitumen content. Hence, optional tertiary bitumen recovery may be sought in the bypass loop comprising line 154, process 155, and line 156 disposed around the line section 132a between the pump 131 and the tailings sump 142.

It may be noted, with respect to the discussions relevant to FIGS. 8, 9, 10, and 11, that, in many instances, the plurality of ponds illustrated for clarity in explaining the processes may often be, in practice, a single pond. In that instance, certain of the process steps, such as pumping clarified water and/or sludge between the ponds, takes place naturally so that no special provisions need be made for carrying out these steps.

It will be appreciated by those skilled in the art, of course, that the systems illustrated in FIGS. 9, 10, and 11 are merely exemplary of approaches toward practical installations which will vary with the process material, type of process, climate, and according to many other factors. The approaches involved are basically to employ the thickening pond, sludge recycled from the field, or a combination of both. The ways in which these approaches can be applied together or separately are quite numerous. Merely by way of example, (1) either one or both sludges may be added to the tailings before sand separation; (2) either one or both sludges may be added to the tailings after sand separation (such as into a tailings sump); (3) extra stages involving repeated sand separation and remixing with fresh sludge may be added with recycle of surplus sludge back to the thickening pond or out to the field; or (4) a settling vessel or cyclone may be used for sand separation or the displacement technique disclosed within previously referenced U.S. Pat. No. 4,088,146, may be used.

Figure 12A:
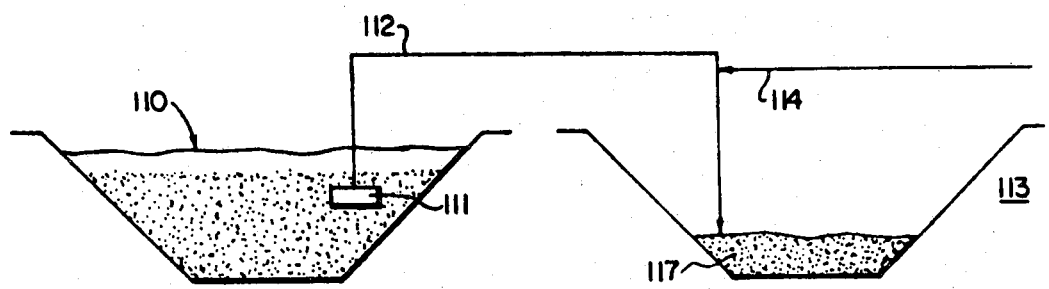
FIGS. 12a, 12b, 12c, and 12d illustrate a sequence of operations by which external sand surcharge to the sludge layer of a tailings pond located in a cold environment can be obtained.

FIGS. 12a, 12b, 12c, and 12d illustrate sequential steps in a process by which an external sand surcharge achieving the result illustrated in FIGS. 4, 5, and 7 can be obtained in regions (such as northwest Alberta) having harsh winters. Consider, as shown in FIG. 12a, a first summer period in which a first auxiliary pond 110 contains sludge received, by way of example, from a primary tailings pond, not shown in FIGS. 12a, 12b, 12c, or 12d. The sludge is withdrawn by pump 111, for transfer, via line 112 to a second auxiliary pond 113. Hydrolyzed starch flocculant may be added, as indicated at 114, if the sludge has not previously been treated with the starch flocculant or if the dosage needs to be renewed or increased. The sludge transfer from pond 110 to pond 113 is carried out throughout the summer.

Figure 12B:
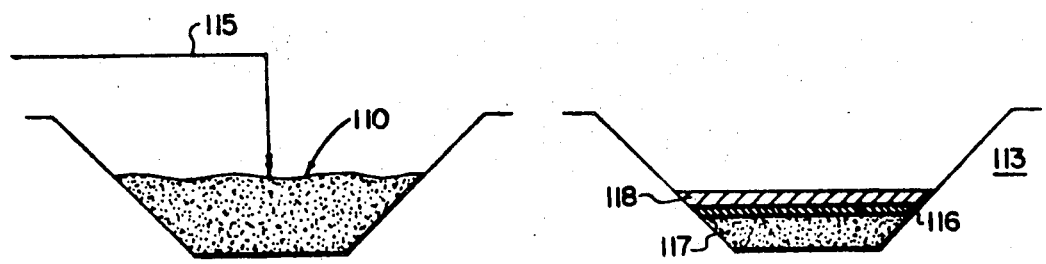
Figure 12C:
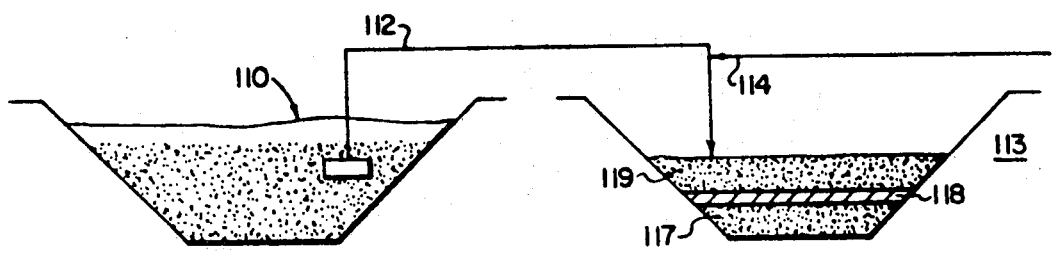

Subsequently, as illustrated in FIG. 12b, during the first winter, sludge from the primary trailings pond is transferred into the first auxiliary pond 110 via line 115. Because of the harshly cold environment at the site of the Athabasca tar sands, a thick ice layer 116 forms on top the sludge 117. After the ice has become sufficiently thick to bear the weight of heavy machinery, a layer 118 of sand is spread on top of the ice layer 116.

Upon spring thaw, the ice layer 116 melts to permit the sand layer 118 to settle on top the hydrolyzed starch flocculant treated sludge layer 117 to be supported thereby and to function as a porous piston to effect further dewatering and compaction of the sludge layer 117. During the second summer, FIG. 12c, sludge is again withdrawn from the first auxiliary pond 110 by the pump 111 and is transferred via line 112 to the second auxiliary pond 113 for deposit as another sludge layer 119 over the sand layer 118. Hydrolyzed starch flocculant is added as indicated at 114 if the transferred sludge has not been previously treated to the desired dosage.

Figure 12D:
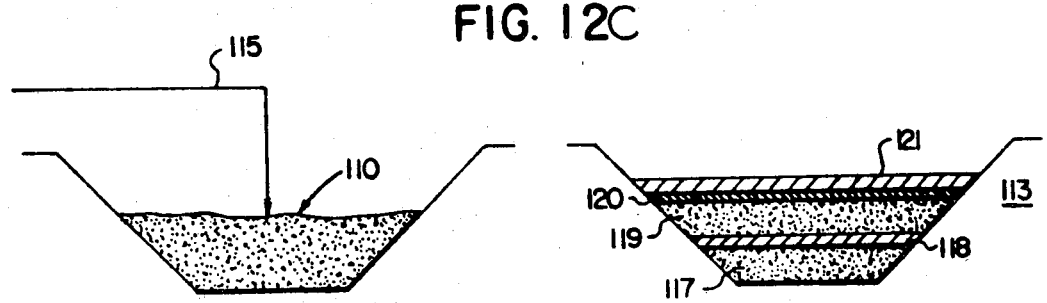

During a second winter, FIG. 12d, sludge from a primary tailings pond is again received into the first auxiliary pond 110 via line 115. In the second auxiliary pond, a new ice layer 120 forms on top the second sludge layer 119, and when the ice layer 120 reaches sufficient thickness, a second layer of sand 121 is spread over it such that, upon spring thaw, the sand layer 121 settles atop the sludge layer 119 to obtain additional external surcharging of the entire system below it.

The foregoing yearly cycle may be repeated until the capacity of the second auxiliary pond is reached whereupon another auxiliary pond can begin to receive sludge from the first auxiliary pond 110.

The manner in which an appropriate dosage of the specific additives discussed above for a given application may be determined is readily understood from a consideration of the curves presented in FIGS. 13–20. These curves illustrate the results of tests carried out on sludge withdrawn from the tailings ponds associated with Suncor's tar sands facility near Ft. McMurray. FIGS. 13 through 18 illustrate the variation of sand-sludge performance based upon dosage. In all cases, the samples were natural sludge with an amount of sand equal to about three times the weight of the initial sludge mineral solids having been added to effect "internal surcharge". More particularly; FIG. 13 illustrates the performance of an untreated sample; FIG. 14, the performance of a sample treated with 25 parts per million (ppm) of hydrolyzed starch flocculant; FIG. 15, 37 ppm flocculant; FIG. 16, 50 ppm flocculant; FIG. 17, 75 ppm flocculant; and FIG. 18, 100 ppm flocculant.

Interpretation of FIGS. 13–18 is straightforward. Referring to FIG. 13, the untreated sample, it will be observed that the accumulative sand percentage from Day 1 to Day 6 moves leftwards. For example, at the top of the graph, Day 1 curve indicates about 14% sand at a position 3 cm below the sample surface. By Day 4, this has been reduced to about 7%; and, by Day 6, less than one-half percent (½%) sand remains at this level. The Day 6 curve, in fact, shows a considerable reduction in sand retained at any level except the bottom.

FIG. 14 is a corresponding set of curves for a sample in which 25 ppm hydrolyzed starch flocculant has been added to the sand-sludge mixture. It will be immediately apparent that the sand reduction at all levels along the Day 4 and 6 curves is notably less than that observed in the untreated sample. In the 37 ppm test recorded in FIG. 15, the sand retention effect is somewhat further improved over the 25 ppm sample recorded in FIG. 14. However, in FIG. 16, it will be observed that the sand retention capabilities of the sand-sludge mixture have been remarkably enhanced, even over the 37 ppm sample. In fact, both the Day 4 and Day 6 curves have moved very close to the Day 1 curve.

Figure 18:
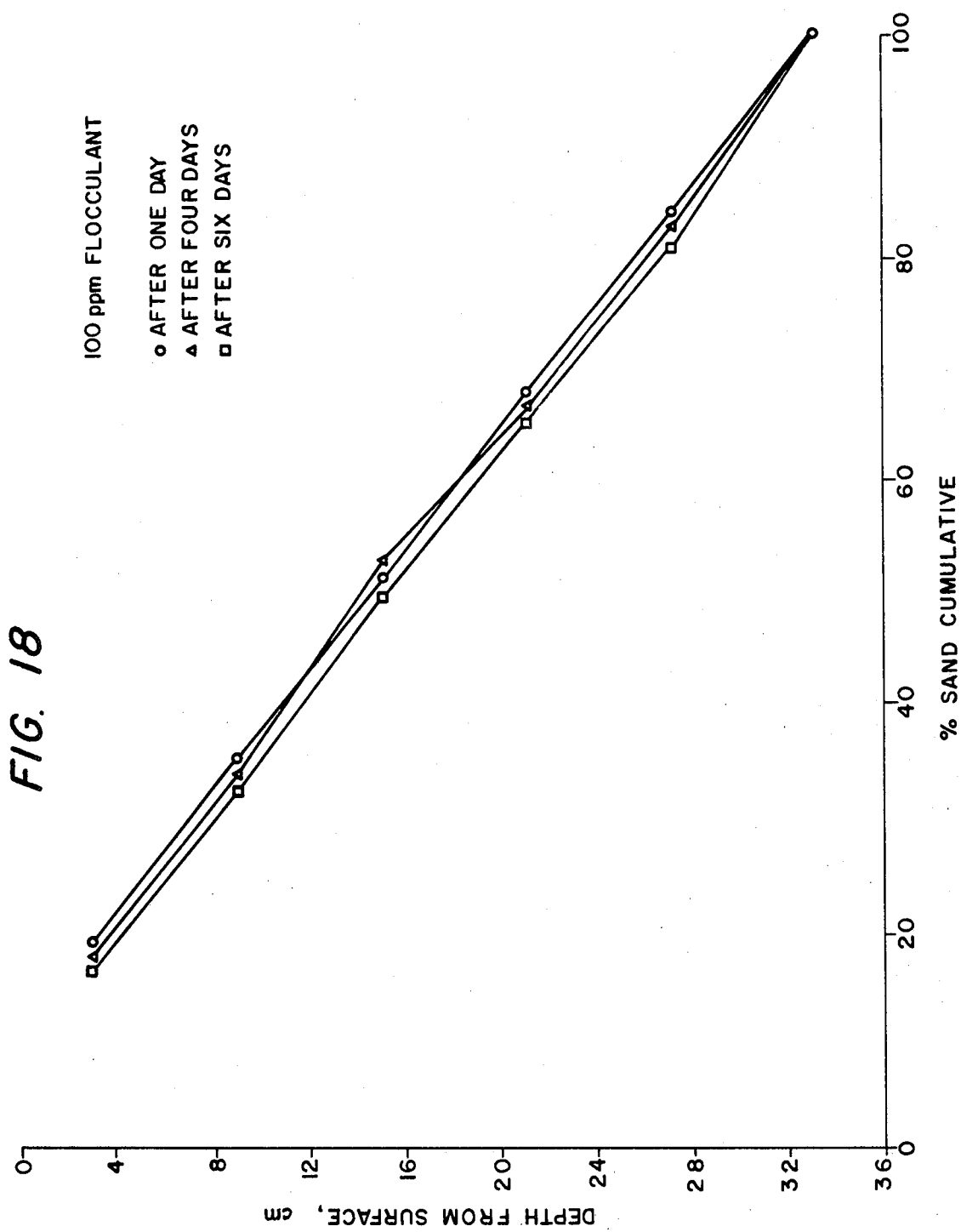
Figure 19:
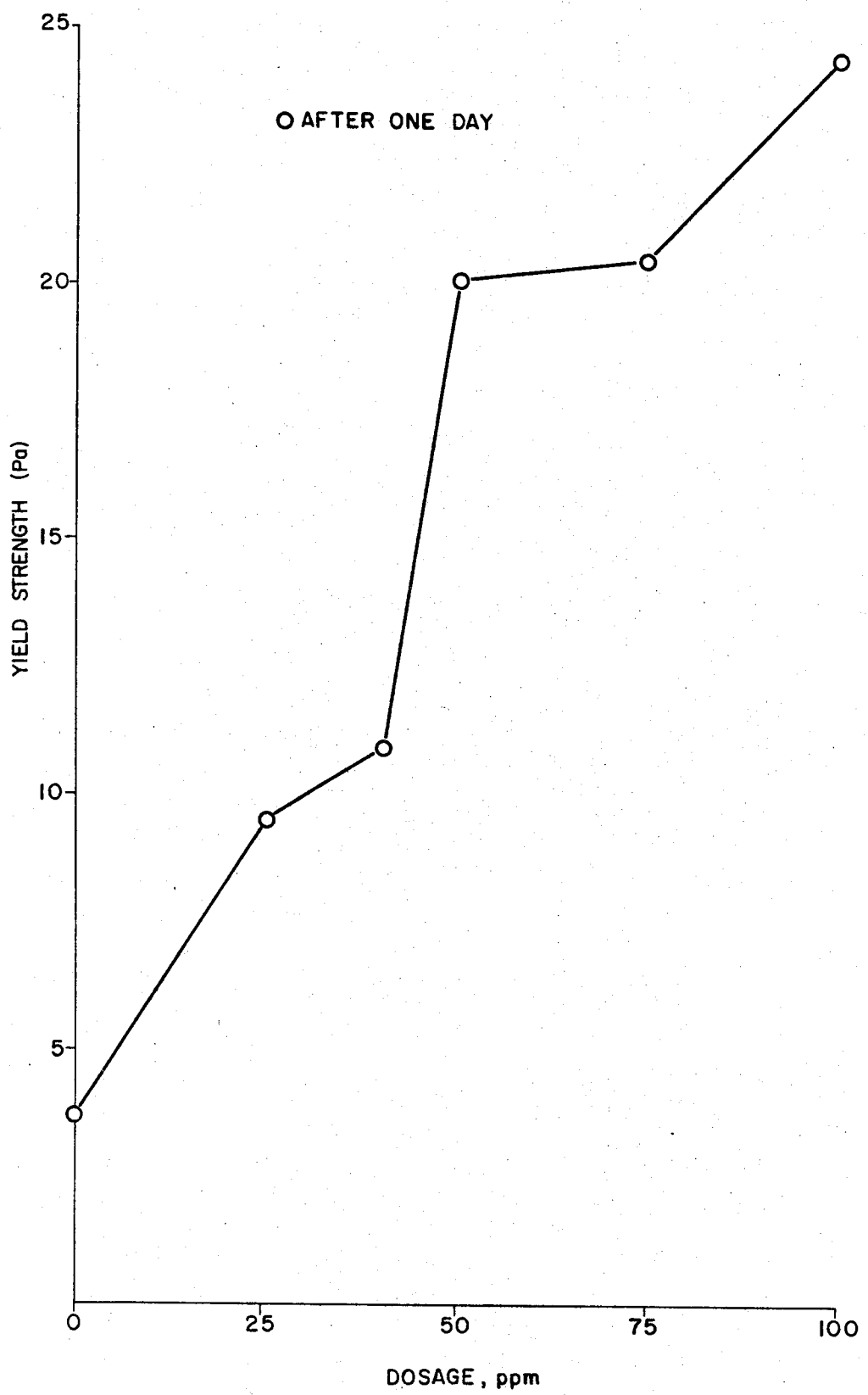
FIG. 19 is a plot of yield strength against dosage for the exemplary sludge.

A slight further improvement is illustrated in FIG. 17, the 75 ppm sample; and, finally, in FIG. 18, the 100 ppm sample, the curves are almost contiguous and actually overlap a bit.

It appears that, for the particular sludge sample represented, a dosage on the order of 50 ppm of the hydrolyzed starch additive imparts to the sludge sufficient shear strength to bring about the heretofore economically unattainable retention of sand by which a remarkable internal surcharging effect is achieved. This dosage determination (again, valid for the particular sludge under test) is corroborated by the curve presented in FIG. 19 which plots yield strength against dosage in ppm. The surge in yield strength observed between dosages of 37 ppm and 50 ppm is readily apparent. In addition, perhaps somewhat less apparent from FIG. 19, the yield strength increases at a much slower rate beyond 100 ppm. Thus, it again appears that, for the particular sludge under consideration, a minimum dosage on the order of 50 ppm is indicated. It is reiterated that diverse sludges and slimes may well require somewhat different effective doses, which doses may be readily determined in the manner given for the exempletary tar sands sludge; however, the dosages for such different sludges and slimes would not be expected to vary by orders of magnitude.

FIG. 20 illustrates the sand distribution in a sand-sludge column after one hour for: Curve 1, untreated sludge; Curve 2, unhydrolyzed starch flocculant; Curve 3, polyacrylamide 1820A; Curve 4, polyacrylamide N100, Curve 5, polyacrylamide 573C; and Curve 6, hydrolyzed starch flocculant. Curve 7 is notably different in that it represents the cumulative sand distribution for a sand-sludge mixture treated with hydrolyzed starch flocculant after 360 hours (15 days). The sand retention capabilities of the hydrolyzed starch flocculant-treated sand-sludge mixture over those treated with other flocculants is manifest and representative. It illustrates the difference between the ability to achieve useful and economical sand surcharge and the failure of previous attempts to achieve meaningful surcharging.

With respect to external surcharge, both used alone and in conjunction with internal surcharge, it has been observed that hydrolyzed starch additive-treated sludge which will hold the sand internally will also support the sand externally. Thus, in the tar sands sludge example, using the 50 ppm internally surcharged sand, an external sand surcharge can be added with no difficulty. Further, with the jump in yield strength observed at a dosage of about 50 ppm, external surcharge can be added to the sludge without any internal surcharge. It has been found, in the case of tar sands sludge, that external surcharge should preferably be added in relatively small increments every few days in increasing layers to allow the sludge to consolidate under such increasing layers.

It will be readily apparent that many diverse techniques may be employed to emplace a sand surcharge over a sludge layer in a tailings pond. For example, the sand may simply be broadcast over the pond surface as illustrated in previously referenced U.S. Pat. No. 4,036,752, or any other workable technique may be used to obtain the effect illustrated in FIG. 4, etc., so long as the sludge layer is first treated with hydrolyzed starch flocculant to improve its shear strength and permeability characteristics.

While the principles of the invention have now been made clear in an illustrative embodiment, there will be immediately obvious to those skilled in the art, many modifications of structure, arrangement, proportions, the elements, materials, and components used in the practice of the invention which are particularly adapted for specific environments and operation requirements without departing from those principles.

The embodiments of the invention in which an exclusive property or privilege is claimed are defined as follows:

1. In a tailings pond system for receiving fines-containing aqueous effluent from an industrial process, the method of obtaining a more thoroughly dewatered sludge layer in the tailings pond by sand surcharging comprising the steps of:
(A) treating the effluent with at least 37 ppm of a hydrolyzed starch additive, which additive is obtained by the aqueous hydrolysis of the starch in the presence of one or more insoluble metal salts formed in situ;
(B) mixing the treated effluent with an effective surcharging amount of sand; and
(C) discharging the treated effluent/sand mixture into the tailings pond;
whereby the treated effluent/sand mixture settles into a sludge layer from which water migrates upwardly.

2. The method of claim 1 in which sludge is withdrawn from the sludge layer and mixed with the treated effluent and sand during step (B) and the resulting mixture is discharged during step (C).

3. The method of claims 1 or 2 in which steps (A) and (B) are carried out simultaneously.

4. The method of claim 3 in which an other additive comprising a lower aliphatic alcohol, acetone, yeast, or lactic acid is added to the hydrolyzed starch.

5. The method of claims 1 or 2 in which the effluent is held, during at least part of step (A), in a thickening pond for a residence period sufficient to obtain thickened tailings water for mixing with the sand during step (B).

6. The method of claim 5 in which step (A) is at least partly accomplished during storage of the effluent in an aging pond prior to transfer into the thickening pond.

7. The method of claim 5 in which an other additive comprising a lower aliphatic alcohol, acetone, yeast, or lactic acid is added to the hydrolyzed starch.

8. In a man-made or naturally-occurring fines-containing body of water, the method of obtaining a more thoroughly dewatered sludge layer in the body of water comprising the steps of;
(A) treating the sludge with at least 37 ppm of hydrolyzed starch additive, which additive is obtained by the aqueous hydrolysis of the starch in the presence of one or more insoluble metal salts formed in situ; and
(B) mixing the treated sludge with about three times the weight of said sludge mineral solids of sand; whereby the hydrolyzed starch additive imparts sufficient strength and permeability to the sludge for supporting the sand and promoting migration of the water, and the sand adds self-weight to the sludge layer such that water within the sludge layer migrates upwardly out of the sludge layer.

9. The method of claims 1, 2, or 6 in which an other additive comprising a lower aliphatic alcohol, acetone, yeast, or lactic acid is added to the hydrolyzed starch.

* * * * *